United States Patent
Grosvenor et al.

(10) Patent No.: US 7,483,057 B2
(45) Date of Patent: Jan. 27, 2009

(54) CAMERA CONTROL

(75) Inventors: David Arthur Grosvenor, Frampton Cotterell (GB); Andrew Arthur Hunter, Stapleton (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

(21) Appl. No.: 10/962,012

(22) Filed: Oct. 8, 2004

(65) Prior Publication Data

US 2005/0094019 A1    May 5, 2005

(30) Foreign Application Priority Data

Oct. 31, 2003    (GB) .................................. 0325470.3

(51) Int. Cl.
*H04N 5/232* (2006.01)

(52) U.S. Cl. ............................. 348/211.9; 348/211.11; 348/239

(58) Field of Classification Search .............. 348/14.03, 348/14.05, 14.08, 14.1, 14.16, 77–78, 115, 348/152–153, 159–160, 169, 211.1–211.14, 348/211.99, 239, 240.1–240.3, 240.99, 333.02, 348/143, 157; 382/103, 255; 702/188; 396/2
See application file for complete search history.

(56) References Cited

U.S. PATENT DOCUMENTS

| | | | |
|---|---|---|---|
| 5,752,094 A | 5/1998 | Tsutsumi et al. | |
| 6,067,112 A * | 5/2000 | Wellner et al. | 348/211.4 |
| 6,147,678 A | 11/2000 | Kumar et al. | |
| 6,434,255 B1 * | 8/2002 | Harakawa | 382/103 |
| 6,750,913 B1 * | 6/2004 | Noro et al. | 348/333.02 |
| 6,809,759 B1 * | 10/2004 | Chiang | 348/211.2 |
| 6,813,439 B2 * | 11/2004 | Misumi et al. | 396/2 |
| 7,095,901 B2 * | 8/2006 | Lee et al. | 382/255 |
| 2002/0097218 A1 | 7/2002 | Gutta et al. | |
| 2002/0191076 A1 * | 12/2002 | Wada et al. | 348/78 |
| 2003/0163289 A1 * | 8/2003 | Whelan et al. | 702/188 |
| 2005/0104958 A1 * | 5/2005 | Egnal et al. | 348/143 |
| 2005/0134685 A1 * | 6/2005 | Egnal et al. | 348/157 |

FOREIGN PATENT DOCUMENTS

| WO | WO1/72034 A1 | 9/2001 |
|---|---|---|
| WO | WO-01/72034 A1 * | 9/2001 |

OTHER PUBLICATIONS

UK Search Report dated Mar. 18, 2004.

* cited by examiner

*Primary Examiner*—Tuan Ho
*Assistant Examiner*—Dennis Hogue

(57) ABSTRACT

Method and apparatus for controlling the field of view of a camera are described. The method includes processing at least one collected image so as to calculate at least two positions of at least one body part of a user, and to determine an area defined by said position; and generating a signal suitable for the control of the field of view of a camera in dependence upon said determined area.

39 Claims, 23 Drawing Sheets

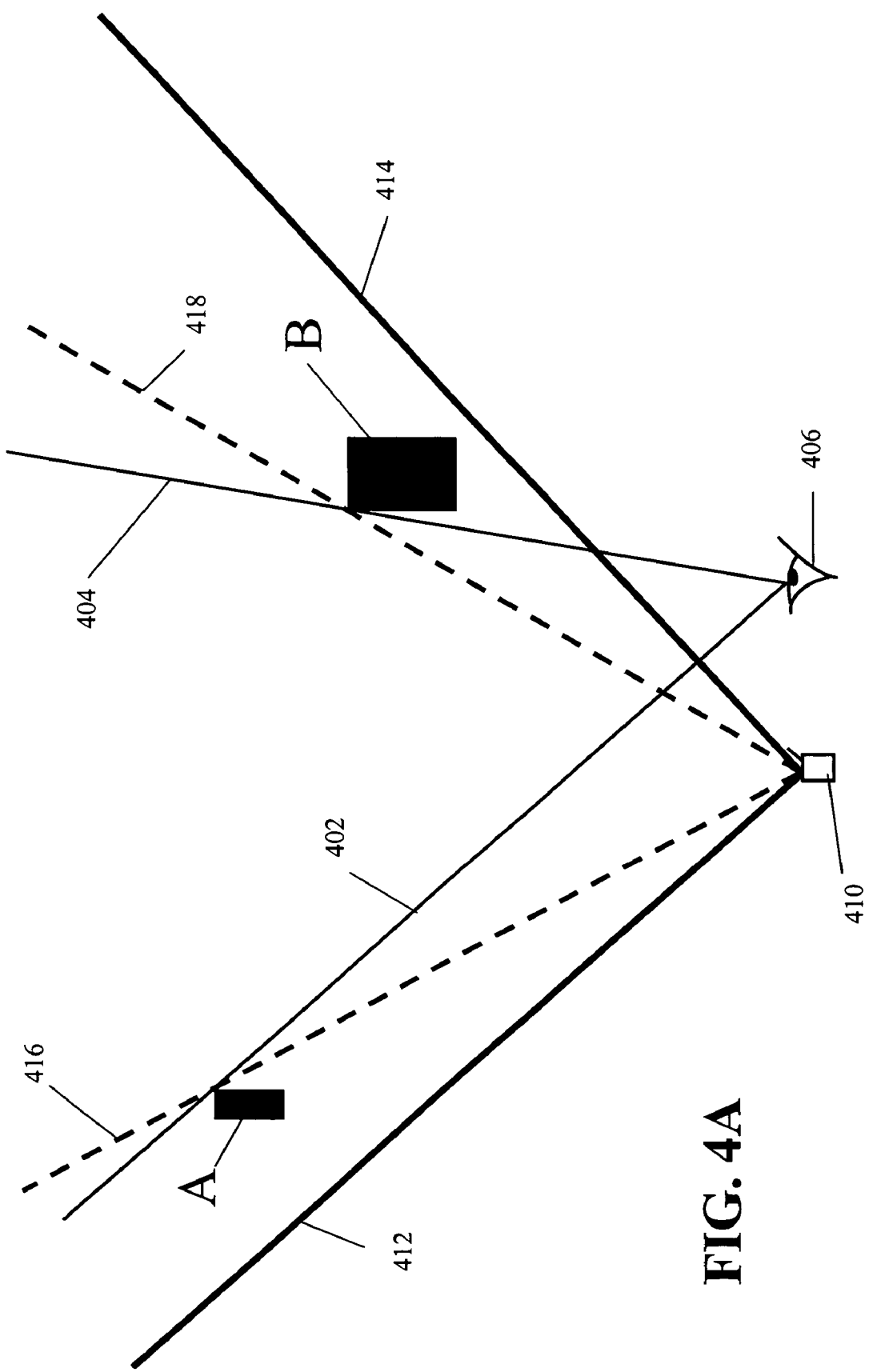

CAMERA CONTROL

TECHNICAL FIELD

The present invention relates to methods, apparatus and computer programs suitable for camera control and particularly, although not exclusively, to the control of the field of view of a camera.

CLAIM TO PRIORITY

This application claims priority to copending United Kingdom utility application entitled, "IMPROVEMENTS IN AND RELATING TO CAMERA CONTROL," having serial no. GB 0325470.3, filed Oct. 31, 2003, which is entirely incorporated herein by reference.

BACKGROUND

A variety of digital and analog cameras exist, capable of capturing images in a number of formats including still picture images, sequences of still picture images and video image sequences.

In most instances, a photographer takes a picture after he has looked through a view finder and determined that the image he desires is correctly within the field of view of the camera. The field of view is the area of the scene that will be captured by the camera, either as a still image or a video sequence. If desired, the photographer may zoom in or out of a scene so as to ensure that all of the desired image is within the field of view of the camera.

U.S. Pat. No. 5,752,094, incorporated herein by reference, describes an auto zoom apparatus for a camera. The camera has an inertial motion sensor arranged to detect a displacement of the camera when a switch is operated, with the detected spatial displacement being used to determine the focal length of the zoom lens. The camera zoom is operated by the photographer aiming the centre of the view finder at one corner of a desired image, pressing the button and moving the centre of the view finder to the diagonally opposite corner of the desired image. The zoom of the camera is hence set based upon the motion of the camera, with the intention being to capture the desired image. This type of apparatus is extremely sensitive to errors within the inertial motion sensors used to detect the range of movement of the camera.

SUMMARY

One embodiment may comprise a first image collection unit arranged to collect at least a first image comprising a view of at least one body part of a user, an image processing unit arranged to process the collected first image so as to recognise from the collected first image a position of the at least one body part of the user, and a control unit arranged to control a field of view of a second image collection unit of the camera to delimit a region of a scene visible to the second image collection unit in dependence upon the recognised position.

Another embodiment may comprise a method of controlling a field of view of a camera, the method comprising processing a collected first image comprising a view of at least one body part of a user to calculate from the collected first image a position of the at least one body part of the user, and controlling the field of view of an image collection unit of the camera to delimit a region of a scene visible to the camera image collection unit in dependence upon the calculated position.

BRIEF DESCRIPTION OF THE DRAWINGS

The components in the drawings are not necessarily to scale relative to each other. Like reference numerals designate corresponding parts throughout the several views, and reference is made to the following figures in which:

FIGS. 4A-E illustrate view framing according to various criteria; and

DETAILED DESCRIPTION

Figure 1:
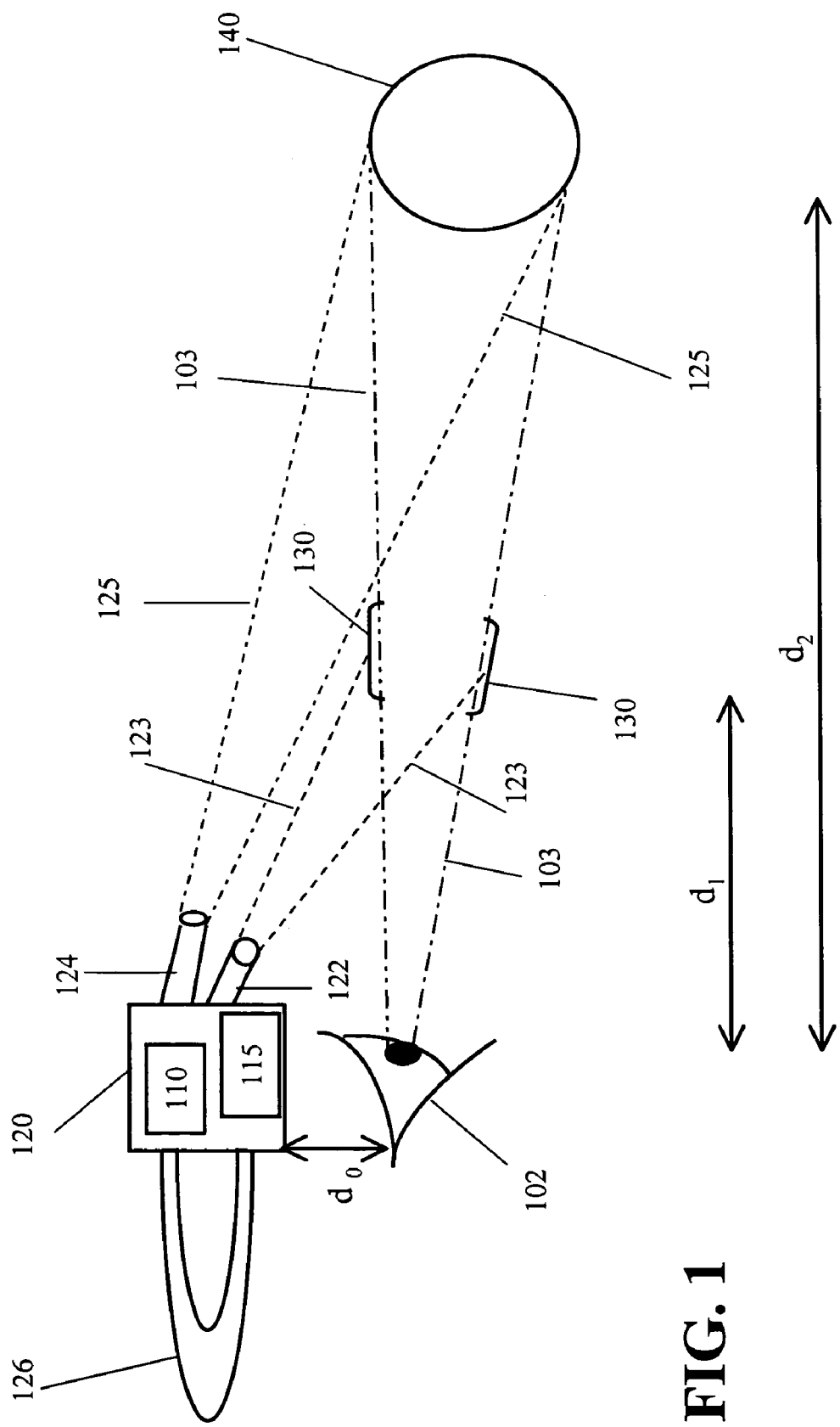
FIG. 1 illustrates a camera according to an exemplary embodiment in use.

In a first aspect, the one exemplary embodiment provides a camera comprising: a first image collection unit (also interchangeably referred to hereinafter as a means) arranged, in use, to collect at least a first image comprising a view of at least one body part of a user; an image processing unit (also interchangeably referred to hereinafter as a means) arranged to process the collected image so as to recognise from the collected first image the position of at least one body part of a user; and a control unit (also interchangeably referred to hereinafter as a means) arranged to control a field of view of a second image collection unit (also interchangeably referred to hereinafter as a means) of the camera to delimit a region of a scene visible to the second image collection means in dependence upon the recognised position.

In preferred embodiments the collected first image includes a hand of the user and the image processing means is arranged to recognise hand gestures based upon recognised orientation/positioning of the hand and/or fingers and, dependant upon a recognised hand gesture, the control means is arranged to control a respective camera setting in a specific manner.

Upon recognising a particular hand gesture, the control means is arranged to control the second image collection means to capture an image of a specific object within a field of view of the second image collection means.

Additionally, the control means may be arranged to control one or more settings of a plurality of second image collection means based on the recognised position. Thus, in various embodiments, the control means may be arranged to control the second image collection means to capture an image of a specific object within a field of view of the second image collection means if the image processing means recognises that the user is deliberately occluding the specific object. Alternatively, the control means may be arranged to control the second image collection means to exclude a specific object from a field of view of the second image collection means if the image processing means recognises that the user is deliberately occluding the specific object.

Additionally, the control means may be arranged to control the second image collection means to align a border of the delimited region with a specific object within a field of view of the second image collection means if the image processing means recognises the specific object as a framing object. Here, the control means may be arranged to control the second image collection means to either include or exclude the framing object from the delimited region.

The settings of the second image collection means which are controllable on the basis of the recognised body part(s) position may comprise one or more of the following camera settings: focus, zoom, aperture, exposure, white balance.

In various embodiments, the image processing means may be arranged to compensate for parallax between the first image collection means and the view point of a user, so as to determine the area defined by the positions as viewed from the perspective of the user.

Parallax compensation may comprise: designating one of the eyes of the user as the dominant eye and assuming the users viewpoint to be a single viewpoint as seen from the dominant eye and calculating a desired field of view of the second image collection means based upon the field of view visible from a single viewpoint as delimited by recognised hand gestures. Alternatively it may comprise assuming a single viewpoint from a position intermediate the two eyes of the user and appropriately calculating the desired field of view.

Parallax compensation may comprise assuming a pair of viewpoints, each located at a respective eye of the user and calculating a desired field of view of the second image collection means based upon the field of view visible from each eye as delimited by recognised hand gestures of the user.

In a further parallax compensation embodiment, a pair of viewpoints, each located at a respective eye of the user may be assumed and a plurality of second image collection means provided, the plurality of second image collection means being arranged, in use, to capture a totality of the possible field of view of the user as viewed from each eye and delimited by gestures of the user.

In another embodiment, an object selection procedure may be performed during set-up procedures of the camera to compose a desired picture. During such a set-up procedure gestures of a user may be captured by the first image collection means and analyzed by the image processing means with a view to recognising which object or objects are intended for selection by a user so as to include or exclude such object or objects from the field of view of the second image collection means. Such object or objects are recognised as intended for selection by the user are used to frame a field of view of the second image collection means.

In some embodiments, the camera is a wearable camera arranged for mounting on at least one of a head, a finger, a hand, a shoulder and an arm.

In various embodiments, the camera further comprises a distance determining unit arranged to determine the distance between a first image collection means and a body part. The distance determining unit may be arranged to determine the distance by determining the size of at least a portion of the body part, and comparing this determined size with a calibration value and, preferably, the distance determining unit comprises a distance measuring device arranged to determine the distance by measuring a signal transmitted from or reflected by at least a portion of the body part.

In some embodiments, the control means is arranged to control the field of view of the second image so as to enable the capture of an image lying within an area of the first image as defined by a recognised position or positions of the body part or parts of the user.

In some embodiments, the control means controls the field of view by adjusting at least one of a digital zoom and an optical zoom of the second image collection means. The control means may be arranged to control the field of view by controlling at least one of a horizontal movement, a vertical movement and a rotation of the second image collection means. Additionally, the control means may be arranged to control the aspect ratio of the field of view.

In various embodiments, the image processing means may be arranged to determine an image lying as viewed through the defined area, and to process the image to determine at least one of: the distance to at least one object within the image; the speed of movement of at least one object within the image; the brightness of at least a portion of the image; the depth of field of at least one object within the image; and the light sources within the image. In this embodiment, the control means is then arranged to control image collection properties of the second image collection means in dependence upon the determined property.

A second image collection means may comprise the first image collection means.

In a second aspect, there is provided a control device for controlling a camera, the device comprising: first image collection means arranged, in use, to collect at least a first image comprising a view of at least one body part of a user; image processing means arranged to process the collected image so as to recognise from the collected first image the position of at least one body part of a user; and signal generation means arranged to generate a signal suitable for the control of a field of view of an image collection means of the camera to delimit a region of a scene visible to the camera image collection means dependent upon the recognised position.

The device may further comprise signal transmission means arranged to transmit at least one of a wireless signal and a medium guided signal for transmission of the signal to a camera.

According to a third aspect, there is provided a method of controlling the field of view of a camera, the method comprising: processing a collected first image comprising a view of at least one body part of a user to calculate from the collected first image the position of at least one body part of a user; and controlling a field of view of an image collection means of the camera to delimit a region of a scene visible to the camera image collection means in dependence upon the calculated position.

In some embodiments, the first image is processed so as to determine a desired field of view of the camera image collection means based upon the positioning of at least one body part.

The method may further comprise generating a signal suitable for the control of the field of view of the camera image collection means.

The collected first image may be an image including a plurality of user body parts and the image processed to calculate the positions of the body parts and to further control the field of view of the camera image collection means based on the calculated body part positions. In some embodiments, the positions act to define edges or corners of the area.

In some embodiments, a single collected image is processed to calculate a respective position of each of two body parts of a user. Alternatively, two collected images may be processed to calculate from each image a respective position of a single body part of a user. In the above, for example, a body part may comprise at least one of a finger; a thumb; a hand; a wrist; an arm; at least two fingers; and a finger and a thumb.

FIG. 1 is a schematic diagram illustrating the construction of a camera 120 and its' use.

The camera 120 is a wearable camera, and in this instance arranged for mounting upon the head (not shown) of a user. The camera is held in place by a strap 126, and is arranged to be located a predetermined distance from and at a predetermined orientation with respect to the eyes 102 of a user, the distance and orientation being represented by displacement vector $d_0$.

In this instance, the camera comprises two separate image collection means in the form of first image capturing devices 122 and a second image capturing device 124. The first image capturing device 122 is arranged to capture images in relatively close proximity to the user, and in particular so as to capture images containing the hands of the user, particularly when the hands are held in front of the user and close to eye level. The camera 120 also includes an image processing means 110 and control means 115.

The second image capture device 124 is movably mounted with respect to the body of the camera 120, such that the device 124 can be tilted (rotated vertically) and panned (rotated horizontally) with respect to the camera body, this movement being achieved by appropriate actuators.

In use, the camera is arranged to not provide any visual feedback to the user i.e., the user cannot use a view finder to determine the field of view of either of the image capture devices 122, 124 of the camera. The second image capture device 124 is utilised to record images that the user wishes to keep. The first image capture device 122 is utilised to control the field of view of the second device 124, by determining the area of the image that the user intends to capture.

In FIG. 1, it is assumed that the user wishes to capture an image of an object 140 at a distance $d_2$ away from the user (and in particular, away from the eye of the user 102).

Lines 130 indicate the area a distance $d_1$ from the eye of the user 102, within which the desired image containing the object appears to fall from the perspective of the user. Lines 103 illustrate the extremities of light rays travelling from the extremities of the object 140 to the eye 102. The user defines (e.g. outlines) the area 130 by using his hands, with the first image capture device 122 capturing an image of the hands. Lines 123 illustrate the extremities of the rays from the edges of the area 130 being collected by the device 122.

This collected image is subsequently processed by the image processing means 110 so as to determine the coordinates of the area 130 and the control means 115 is arranged to control the field of view of the second image capture device 124. In this instance, $d_1$ is calculated by the camera first determining the apparent size of the hands, and comparing this apparent size with a previously calibrated size of the hands stored in memory (not shown). As the displacement vector do of the camera from the eye 102 is known, then the image viewed by the user through the area 130 can be estimated.

If the object (or objects, or scene) that the user wishes to capture in an image is a long distance away from the user, than the effects of parallax between the eyes 102 of the user and the second image capture device 124 will be relatively insignificant, and no parallax compensation is required.

In FIG. 1, lines 125 indicate the extremities of the rays of light passing from the extremities of the object 140 to the second image capture device 124. It will be observed that, in the relative distances $d_1$ and $d_2$ shown in this figure, the effects of parallax between the device 124 and an eye 102 of the user is significant. In order to compensate for this, and to ensure that the desired object/field of view is captured by the second image capture device 124, the second image capture device 124 comprises a distance measuring unit (not shown). In this instance, the distance measuring unit is an ultrasonic device arranged to determine the distance of an object from the device 124. The distance measuring device is mounted on and aimed parallel to the direction of the field of the view of the image capture device 124, so as to estimate the distance of an object that would be expected to fall within the field of view of the image capture device 124.

Initially, a predetermined value of $d_2$ is assumed (estimated), and the second device 124 orientated based upon the determined area 130 by assuming that the desired object in the field of view is at the assumed distance $d_2$. The field of the view of the second device 124 is also adjusted so as to consistent with the image at distance $d_2$ that would have been defined by the area 130 from the view point of the eye views 102.

The distance measuring unit then measures the distance to any object within the expected field of view of the second device 124. If the measured distance is consistent with distance $d_2$, then an image is captured. If not, then iterative estimates of $d_2$ are made until the distance measuring device measures a distance consistent with $d_2$. Each subsequent estimate is made by taking into account the current estimate of $d_2$ and the actual measurement distance. Subsequently, the second device 124 is utilised to record an image. In order to circumvent, or assist with, this iterative estimate of $d_2$, the user can input information indicative of $d_2$ by a controller interface. For instance, the control interface could be a speech recognition device, with the user speaking to indicate an estimated distance to the object (or to select a mode, with different modes corresponding to different ranges of distances of objects). Alternatively, such information could be input using a keypad.

It will be appreciated that the area 130 enclosing a desired image, as seen from the view point of a user, can be defined in any number of ways using the hand(s) 202 of the user. FIGS. 2A-2D illustrate alternative manners in which the hands 202 of the users could be utilised to define the area 130. FIGS. 2A-2D all illustrate general scenes 150, with the user wishing to capture the image within the area 130 (indicated by a dotted line within the figures).

Figure 2A:
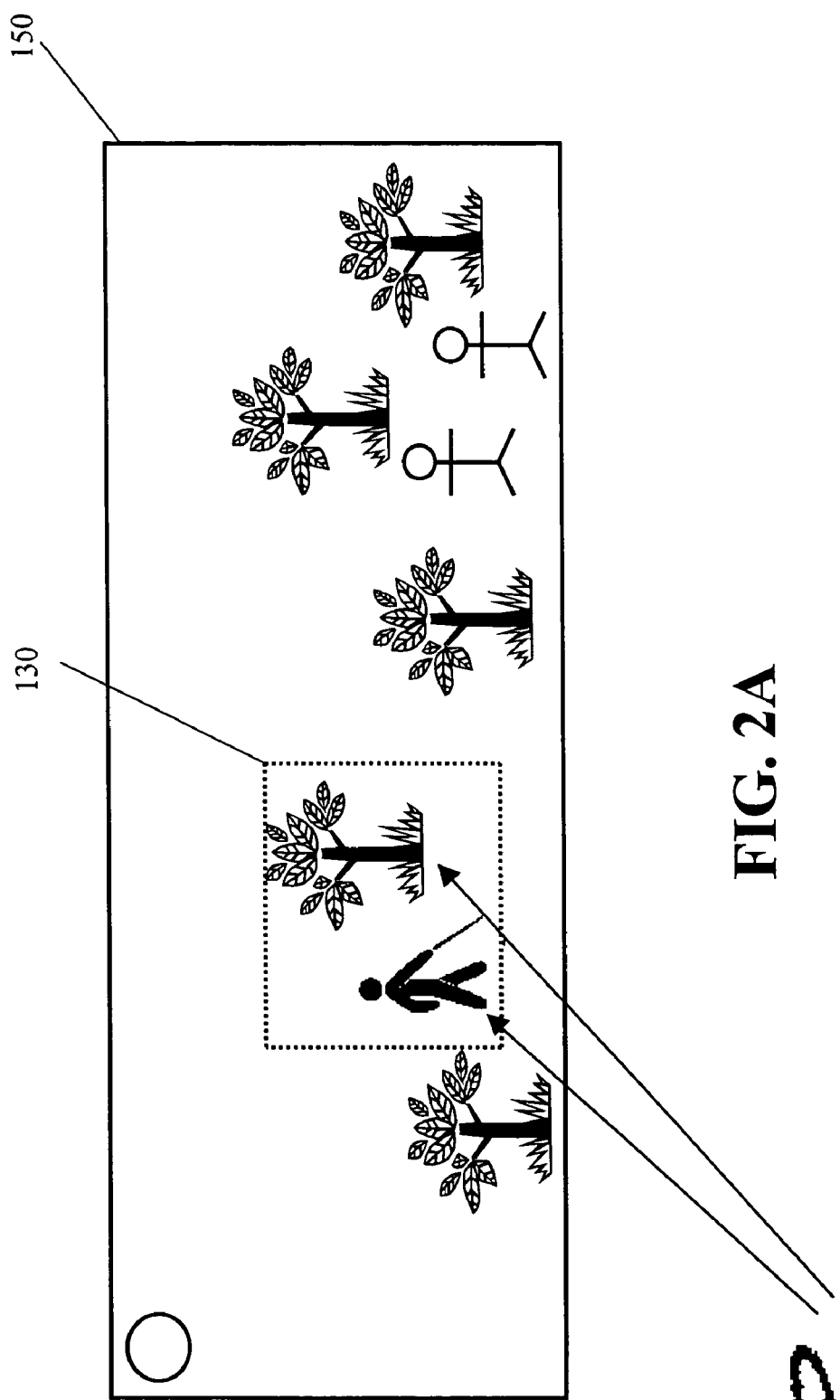
FIGS. 2A-2D illustrates various gestures that could be utilised to frame a field of view.

As can be seen in FIG. 2A, a user can point to a number of objects within the desired field of view, the processing unit of the camera subsequently operating to ensure that each of the pointed to objects lies within the field of view of the second device 124.

Alternatively, the user could point to (or even touch) two or more of the corners of the desired field of view (e.g. a first corner and the diagonally opposite corner) so as to define the desired field of view.

Figure 2B:
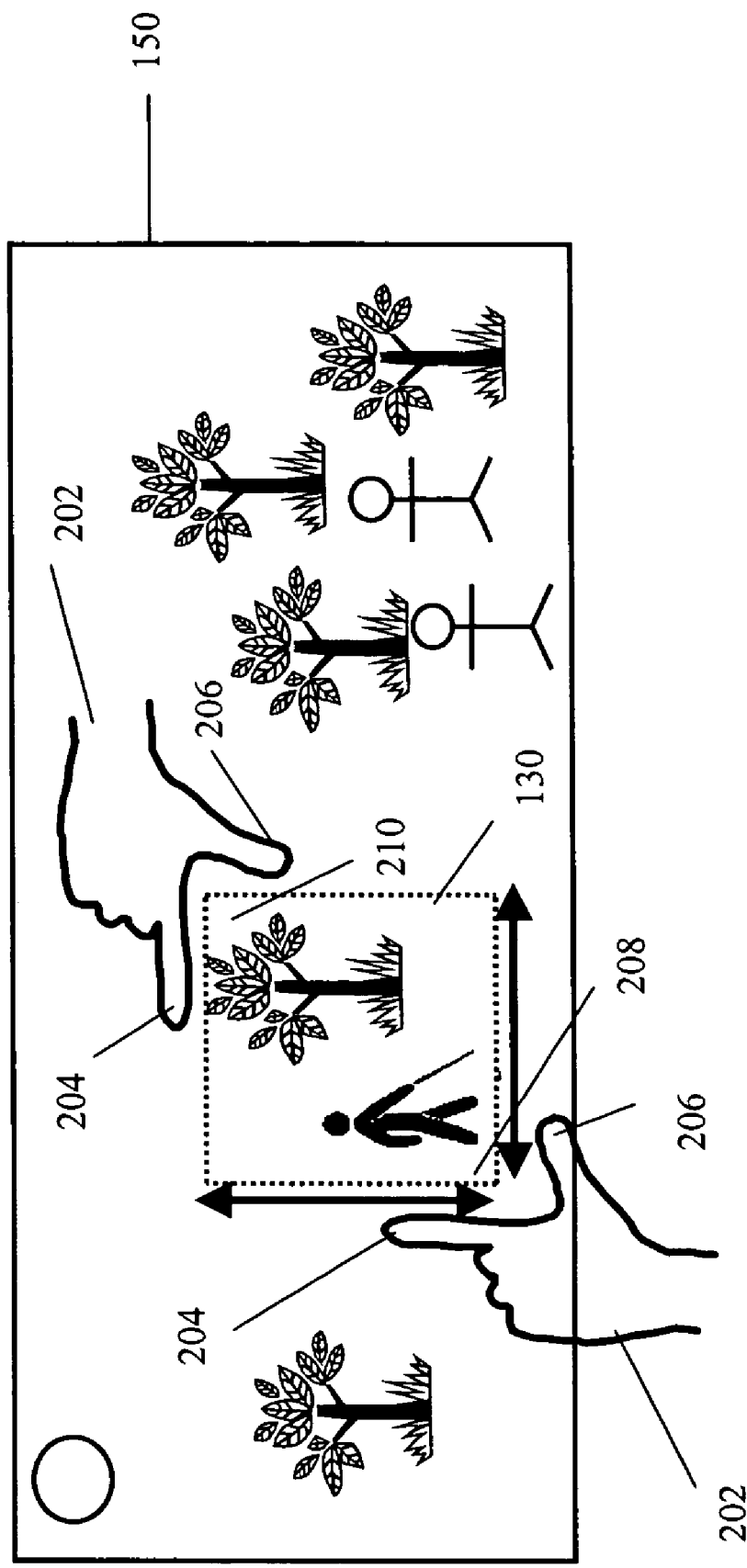

Alternatively, as shown in FIG. 2B, two diagonally opposite corners can be defined by a user forming an L shape with a finger 204 and thumb 206 of each hand 202, and using each hand to define a separate, diagonally opposite, corner 208, 210 of area 130.

The hand gestures utilised in FIGS. 2A and 2B are particularly useful for defining an area of a field of view where the aspect ratio of a field of view (and hence the subsequent captured image) can be controlled.

Figure 2C:
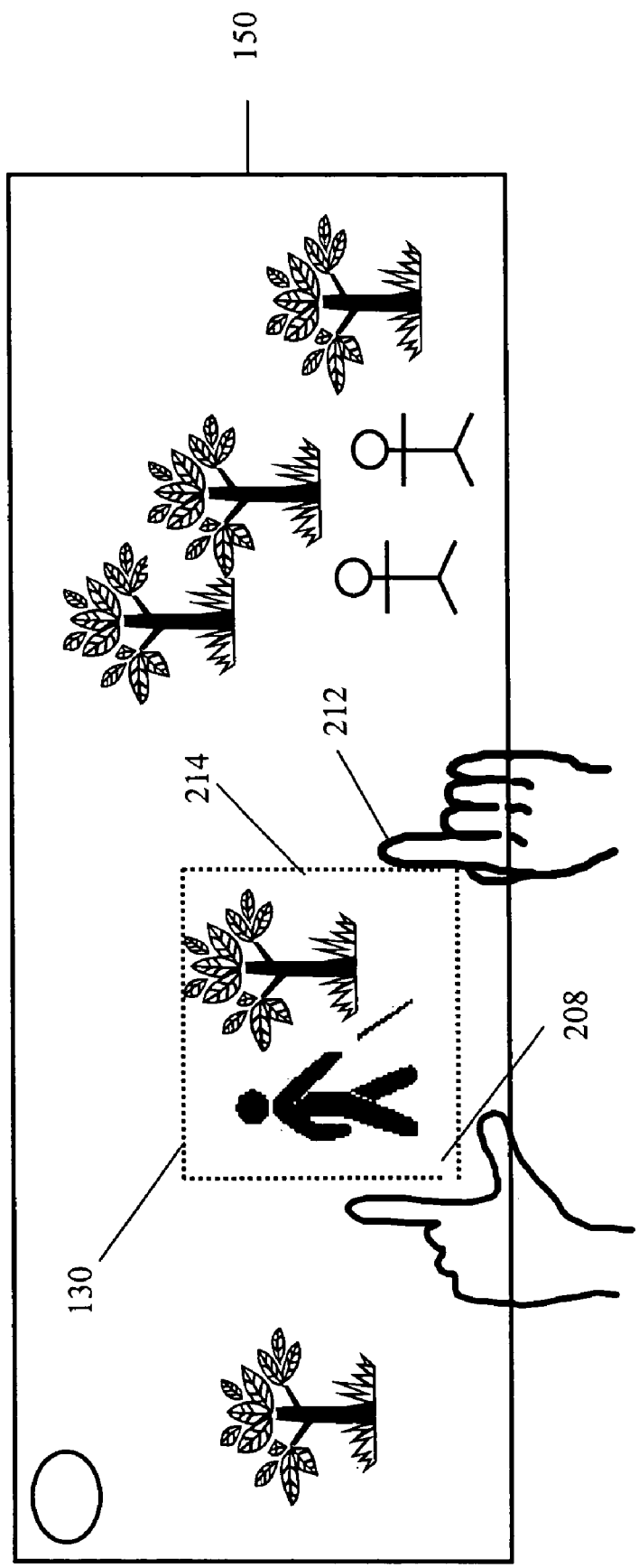
Figure 2D:
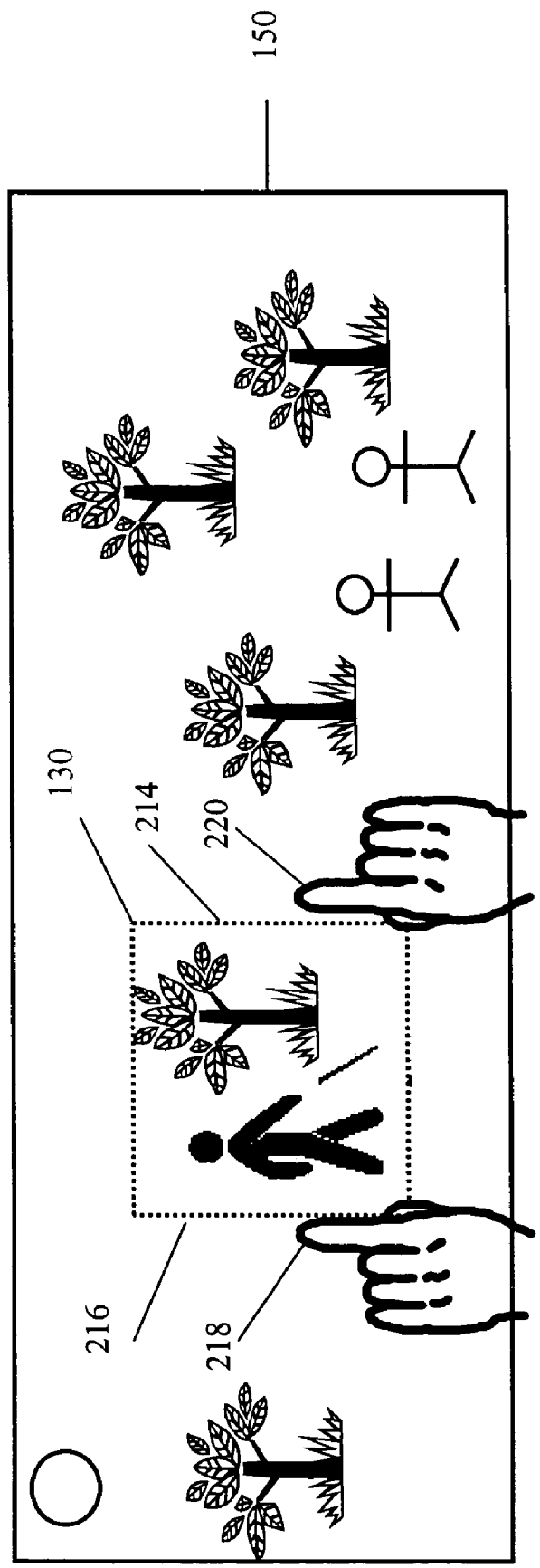

Assuming that the aspect ratio of the field of view is constant (or controlled using another means e.g. menu selection), then a user could use hand gestures to define a corner of the rectangular field of view 130, and an edge of the field of view not adjoining the corner. For instance, FIG. 2C shows a user using an L shaped hand gesture to define the lower left hand corner 208 of the field of view 130, and a flat hand 212 gesture to define the right hand edge 214 of the field of view 130.

Alternatively, in another embodiment it is assumed that the hand gestures define the middle of, or another predetermined position on, the edges of the field of view 130. For instance, FIG. 2D indicates flat hand gestures used to define the left and right hand edges of the field of view (216 and 214, respectively), it being assumed that the tops of the fingers (218 and 220, respectively) on each hand define the centre of the left and right edges (216 and 214, respectively). Here, the image processing means 110 may be set up to recognise predetermined framing objects or specific framing gestures, such that when such a framing object or gesture is recognised the control means 115 (FIG. 1) is arranged to automatically align the border of a delimited region with the framing object. A subsequent hand gesture using both hands could be utilised to define the upper and lower edges of the desired field of view, once the left and right edges have been defined (or vice versa), if the aspect ratio is to be controlled. It will be appreciated that in the case of a framing object/gesture the control means may either automatically include the object as a border or exclude the framing object from the edge of the delimited region.

Another possibility for defining a field of view 130 comprises obscuring the view 130 with an object such as a book held up in front of the user.

Another option may be to recognise a front view of a users hand to denote object inclusion within a scene and the rear view to denote exclusion.

Various techniques and processes for the automatic recognition of hand gestures and positions are known in the art. For instance, U.S. Pat. No. 6,147,678, incorporated herein by reference, describes a computer interface system for controlling a computer and inputting commands by tracking motion of the users hand in a three-dimensional coordinate system, and recognising the motion and gestures.

From the above, it will be realised that due to the displacement vector $d_0$ of the camera 120 from the eye 102 (FIG. 1) of the user, it is important to achieve a proper estimation of the actual field of view 130 intended for delimitation by the user.

Accordingly, with the aid of FIG. 3A to 3J, scene (or field of view) selection algorithms suitable for use with various embodiments are discussed below.

The algorithms discussed below achieve the requirements of (a) determining the location and pose of the gesturing structure delimited by a gesture from the three dimensional (3D) position, structure and orientation of a persons body parts or framing tool, and (b) determining the objects in the scene that would be contained within the region delimited by the gesture from the viewpoint of the person carrying the camera.

The above can be determined given the 3D structure of the scene, and the viewpoint of both the person and the camera. The viewpoint of the person can be modelled as a single camera, although it is the fusion of two views (from each eye).

The images of the delimited objects are used to determine a region within another camera viewpoint that is used to control the camera settings for one of focus, zoom, or exposure.

An alternative approach is to determine the objects in the scene that would be outside the region specified by the delimiting gesture from the viewpoint of the wearer, i.e., excluding regions of the image rather than including them.

Figure 3A:
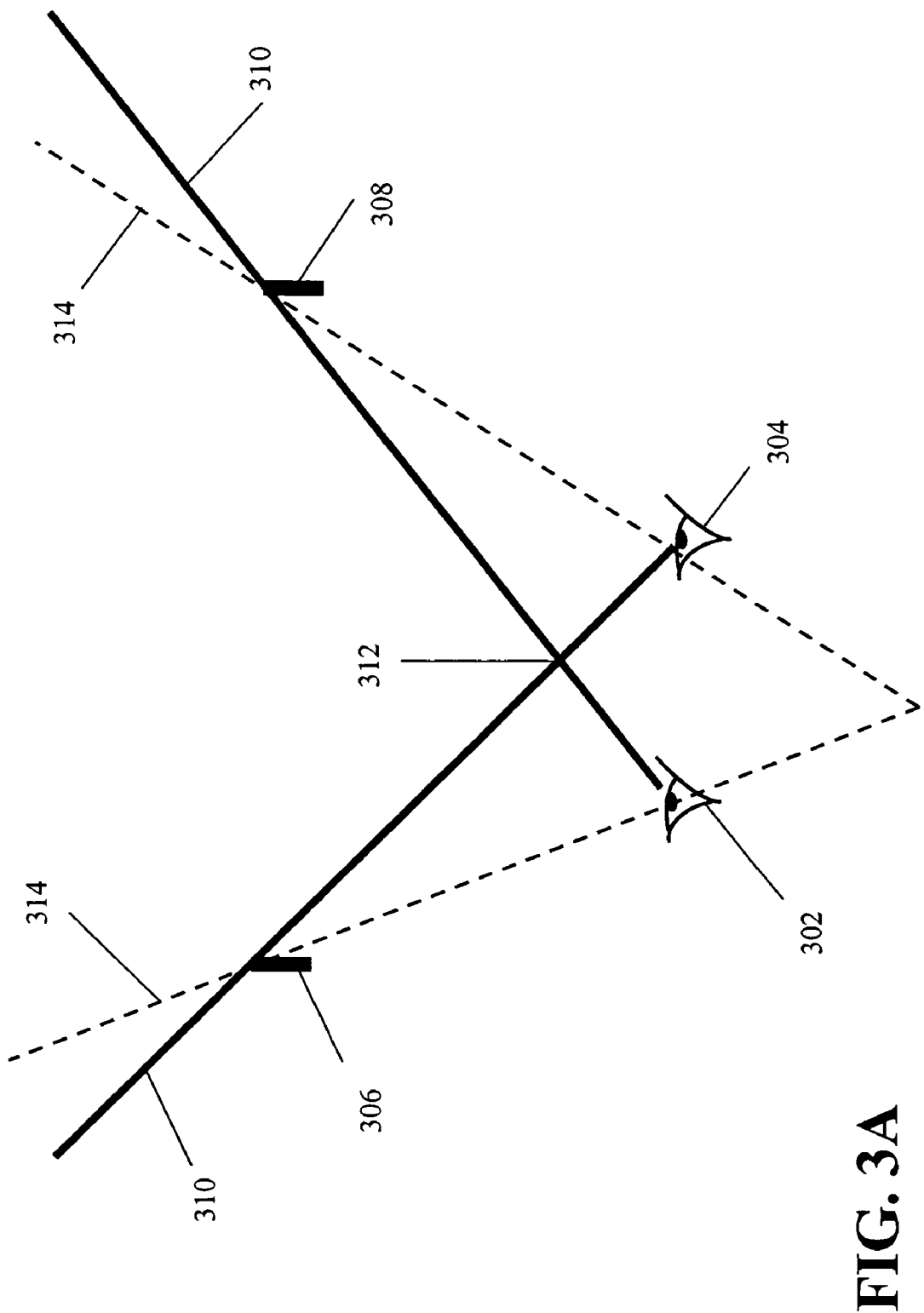
FIGS. 3A-3J illustrate view selection according to a number of different scenarios and methods.

FIG. 3A illustrates a first scene selection technique referred to as "single virtual fused viewpoint". The diagram shows the field of view as perceived by a person watching a scene through two eyes 302, 304, in which some of the scene is delimited by a gesture (two hands 306, 308 positions).

In FIG. 3A the bold lines 310 enclose the total field of view seen as the fusion of the views from both eyes 302, 304. This bold line delimited field of view can be captured by a single camera, that is placed at the intersection 312 of the two bold lines 310. A person's two-eye view allows you to see things that otherwise could only be seen from a single camera forward of the eyes 302, 304. At this intersection point 312 of the two bold lines 310, the delimited field of view can be modelled as a single virtual viewpoint or camera. [This as we see later is not quite true and is a simplification.]

The bold lines 310 delimit the maximum possible field of view that can be perceived by a person.

Assuming that no single eye predominates, then the optical axis of the single virtual camera would point mid-way between the two hands 306, 308, and its field of view set by the delimiting hands 306, 308. We can label objects in the scene according to whether they occur within the field of view of this virtual camera.

This virtual camera viewpoint can move as the hands 306 and/or 308 change position, or if their distance apart varies. Obviously it is possible to move the hands 306 and/or 308 along the bold lines 310 and still keep the same intersection point 312. Neglecting the limited field of view of each eye and their orientation (thus we only model the simple case where both eyes can see the maximum contribution), then there is a very simple linear model for its position given a particular width for the hands and eye spacing.

It is a constant proportion of the line between the mid-point between the hands and the mid-point between the eyes.

$$(ix, iy) = \left(\frac{2d}{2d+s}\right)((s/2)+x, y)$$

This assumes that the hands 306, 308 are parallel to the line between the two eyes 302, 304. Distance $2_d$ is the distance between the eyes 302, 304 and distance s is the distance between the hands 306, 308. The hands 306, 308 are positioned at (x,y) and (x+s,y), and the eyes 302, 304 at (−d,0) and (d,0). It is also clear that we can always derive a virtual s by sliding one of the hands 306 or 308 along its line to the same y coordinate.

The dashed lines 314 show the extent to which an object delimited by the hands 306, 308 would occlude the scene. This may be useful for selecting objects in the scene that are occluded by the hands 306, 308 (or some other object). The difference between the dashed lines 314 and the bold lines 310 show the extent to which the eye could look around an object placed between the points marked by the hands 306, 308. Interestingly these lines 314 intersect behind the position of the eyes 302, 304. Similarly they define a virtual camera position from which a camera would see the same view around this object. Of course the two eyes 302, 304 allow a person to see around every object in the scene to a certain extent.

Figure 3B:
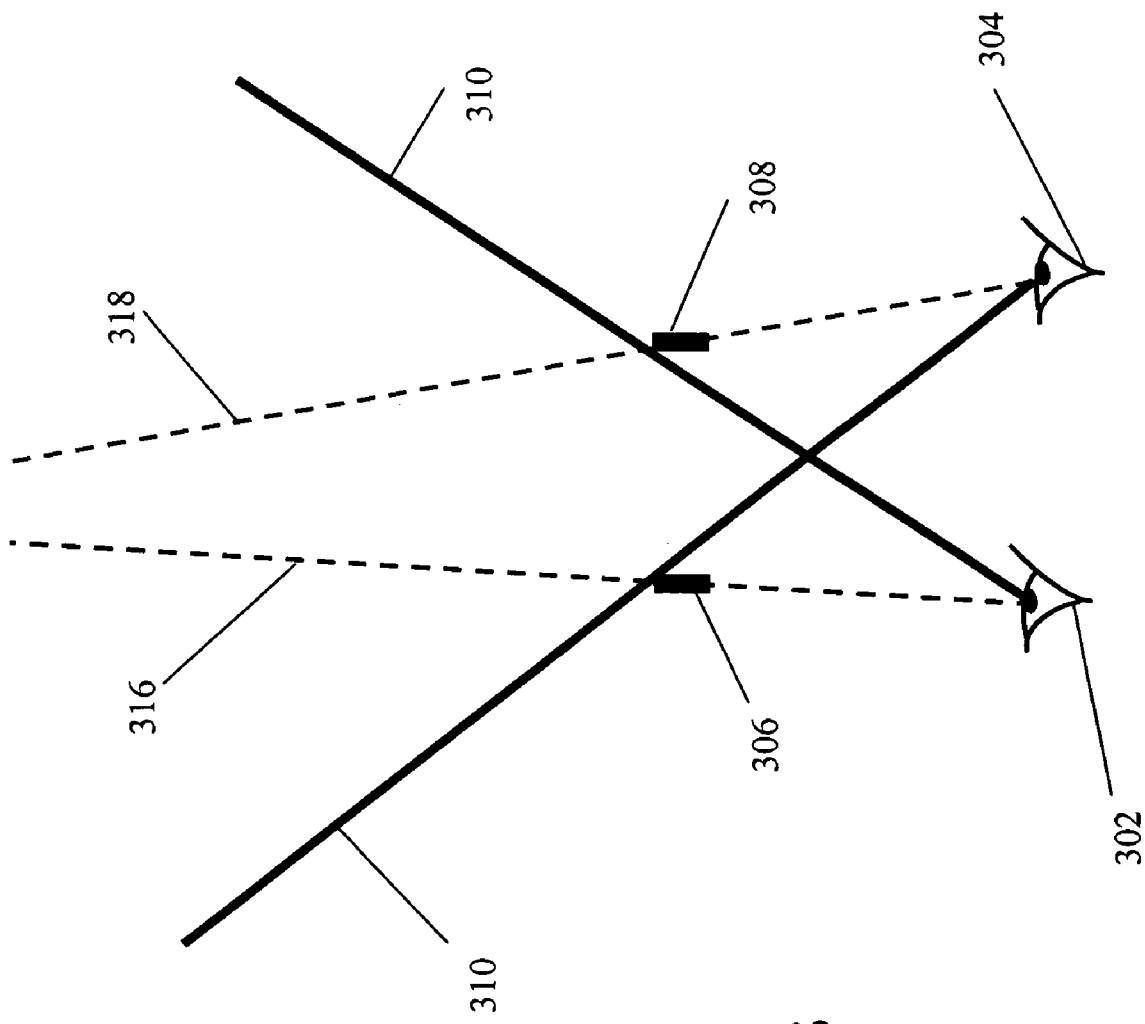

FIG. 3B shows a similar situation to the one of FIG. 3A, but in this diagram the gestures delimiting the required scene selection are relatively much more closely spaced at about the spacing of the eyes or less. Here, the dashed lines 316 converge in the scene rather than diverging as before. This is an example of being able to see around the back of a post or finger.

Figure 3C:
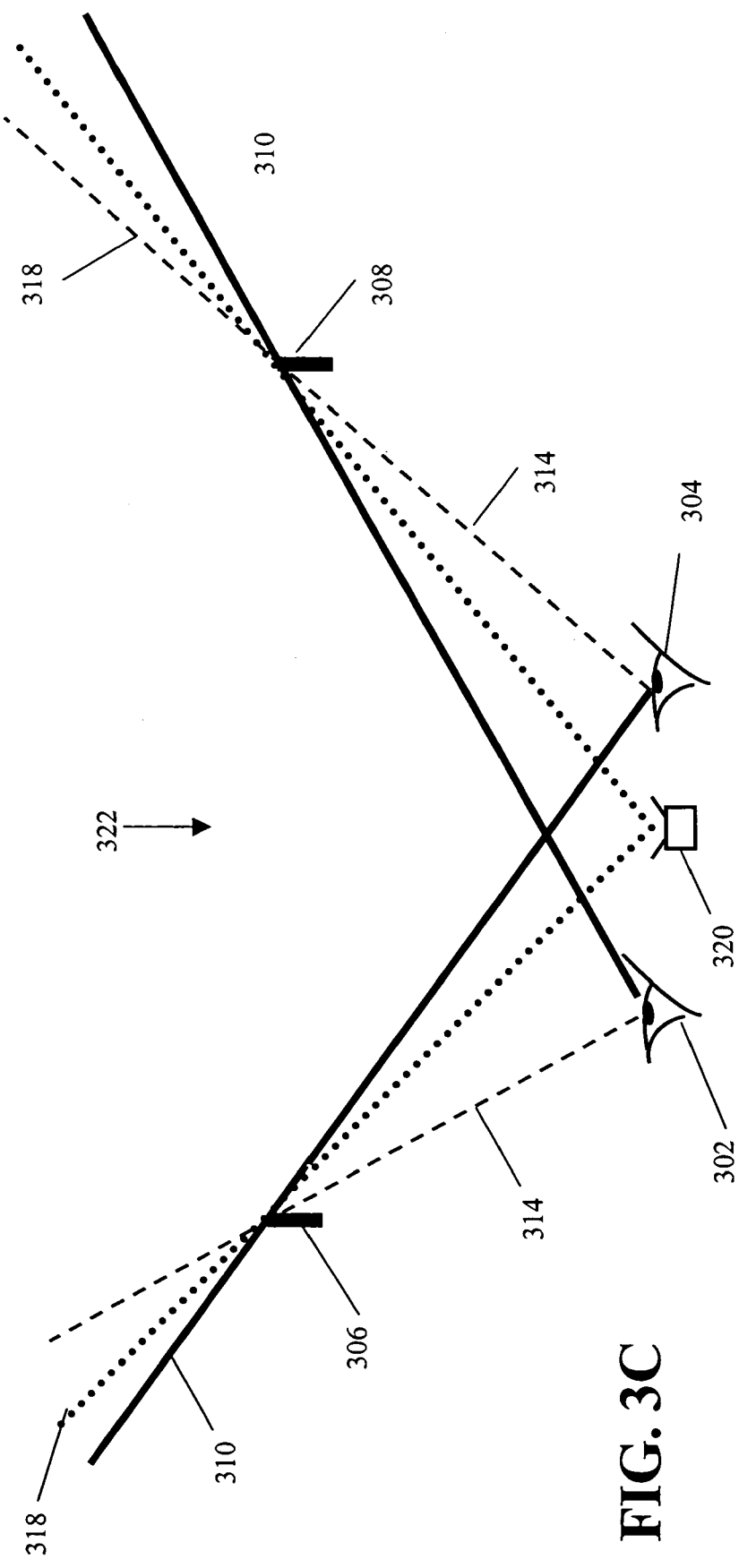

Referring to FIG. 3C, there is shown a representation of what scene would be captured by a single camera mounted mid-way between the eyes 302, 304. Here, the dotted lines 318 show the view that would be obtained from such a camera 320.

FIG. 3C shows that a camera 320 in this position would see less than the person between the two hands 306, 308 could see. This camera 320 is farther from the scene than the viewpoint of the person (the virtual fused viewpoint defined by the intersection of the bold lines).

Figure 3D:
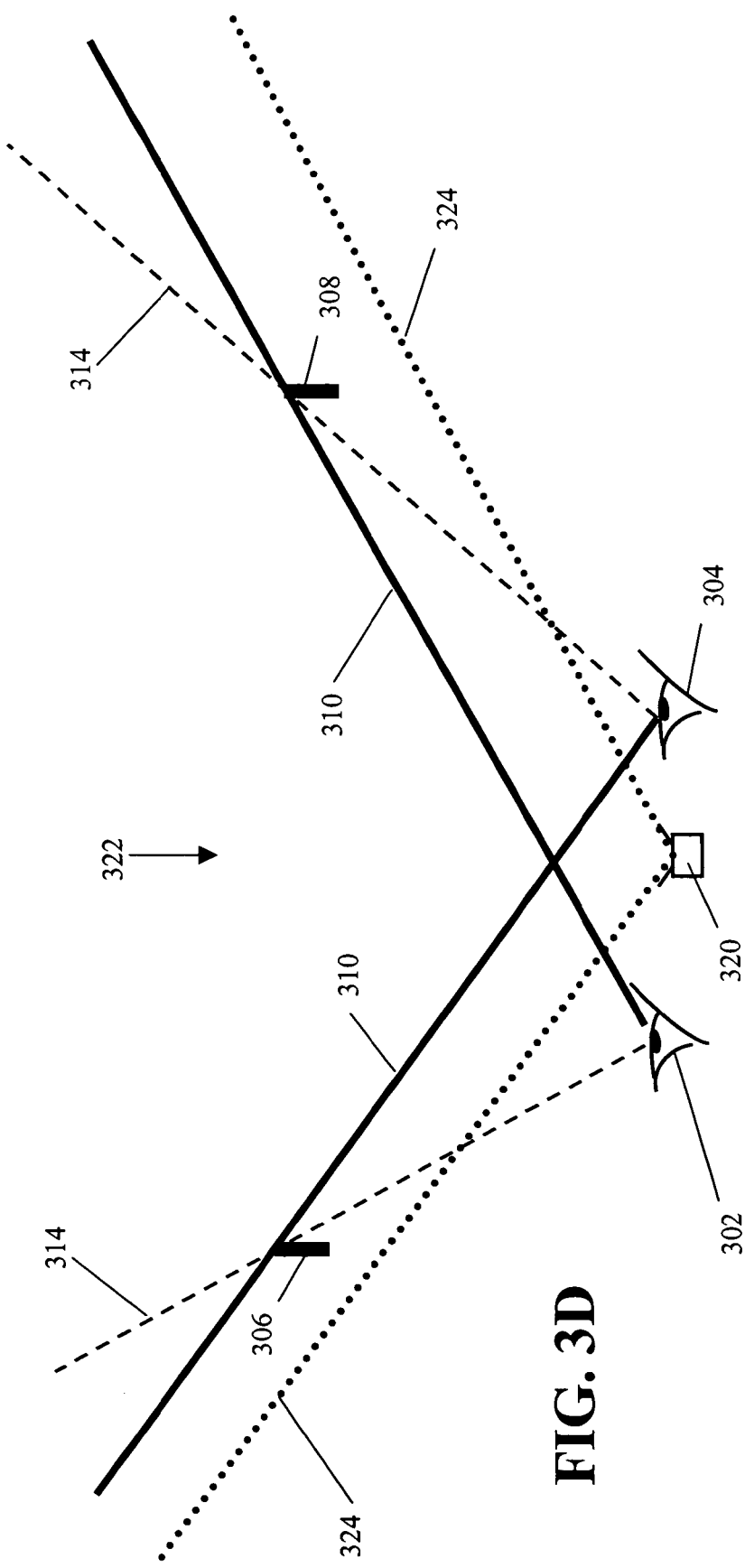

To be used successfully, a camera 320 between the eyes 302, 304 needs to have a field of view sufficient to capture the delimited region 322. To do this it must at least have a field of view whose boundary lines 324 are parallel to the bold lines 310 as shown in FIG. 3D.

The use of a field of view delimited by the dotted lines 324 to control the zoom on the camera does not depend upon the scene geometry, but only on the position of the hands 306, 308 and eyes 302, 304.

The position of the eyes 302, 304 should either be approximated or found before during a calibration phase.

Clearly the hands 306, 308 will actually obstruct some of the scene objects delimited by the hands in this case, i.e., after setting the field of view the hands 306, 308 need to be removed.

This difference in viewpoints consists of a change in depth plus a small translation. The forward movement introduces a depth dependent scaling into the image.

$$\frac{z}{z + \Delta z}$$

whereas the translation introduces a depth dependent translation.

$$\left(k\frac{\Delta x}{z}, k\frac{\Delta y}{z}\right)$$

This translation will have a very small effect as far as the delimiting of objects in the scene is concerned.

Figure 3E:
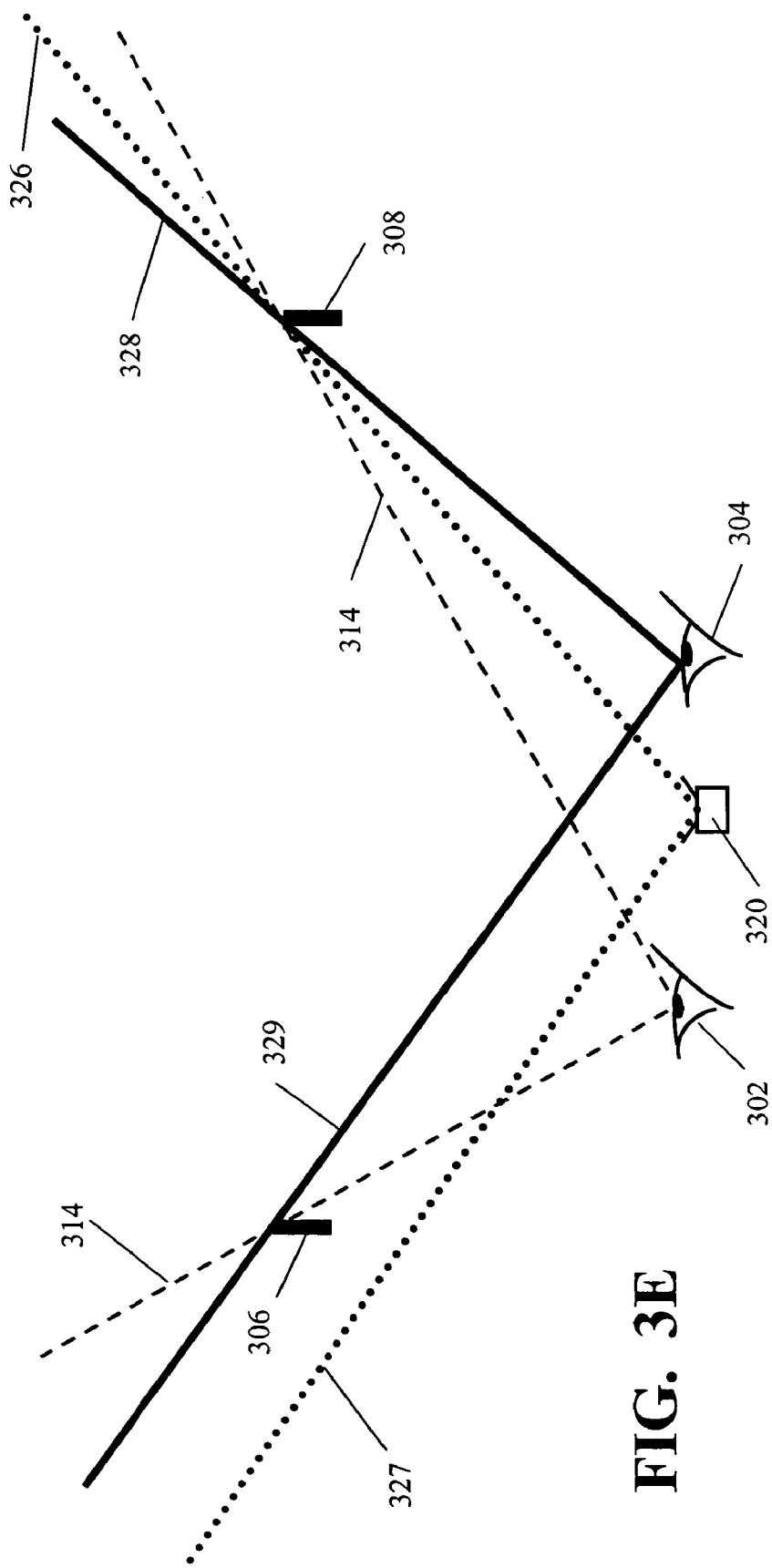

FIG. 3E shows the field of view required with a camera 320 placed between the eyes 302, 304 when there is a dominant eye 304. This might be known through a prior calibration step or might be assumed (e.g. the user might designate right eye dominance and elect to close the left eye when performing scene selection).

As the camera 320 is to the left of the dominant right eye 304, the field of view delimited by the right hand 308 (the right dotted line 326) is sufficient to delimit the right-most part of the scene perceived through the dominant eye 304 (the right bold line 328), beyond the distance where the hands 306, 308 are placed. This assumes that there is nothing of interest between the eyes 302, 304 and the hands 306, 308.

The position of the camera 320 to the left of the dominant eye 304 means we have to make the left dotted line parallel 327 to the left bold line 329. This is the only way of avoiding the capture of certain objects outside of the scene. This is the least field of view that the camera 320 can have to the left. It can have larger but this would waste pixels.

Figure 3F:
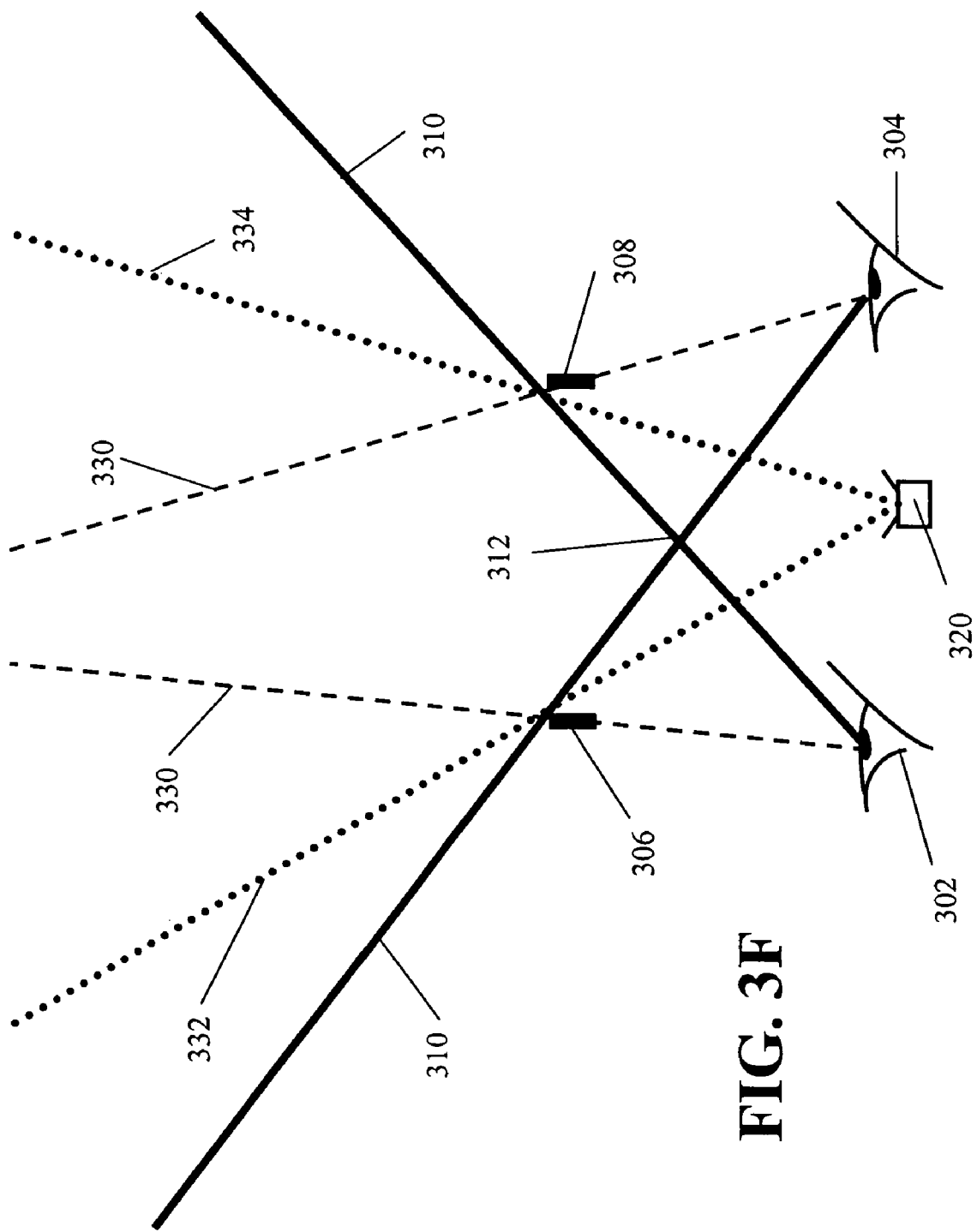

FIG. 3F shows the situation in which a camera 320 is mounted mid-way between the eyes 302, 304 and the scene delimited by closely positioned hands 306, 308. Here, once again the field of view actually captured from a single camera 320 mid-way between the eyes needs to have a wider field of view than the minimum for an optimum positioned camera 320 (i.e., one placed at the intersection 312 of the two bold lines 310).

The dashed lines 330 now converge indicating that it is possible to see around the back of a small occluding object.

Once again in order to capture the whole field of view, we need to set the left and right dotted lines 332, 334 to be parallel to their left and right bold counterparts. So, from the perspective of camera control, narrow spacing between the hands 306, 308 does not effect the way in which the camera zoom would be controlled.

Figure 3G:
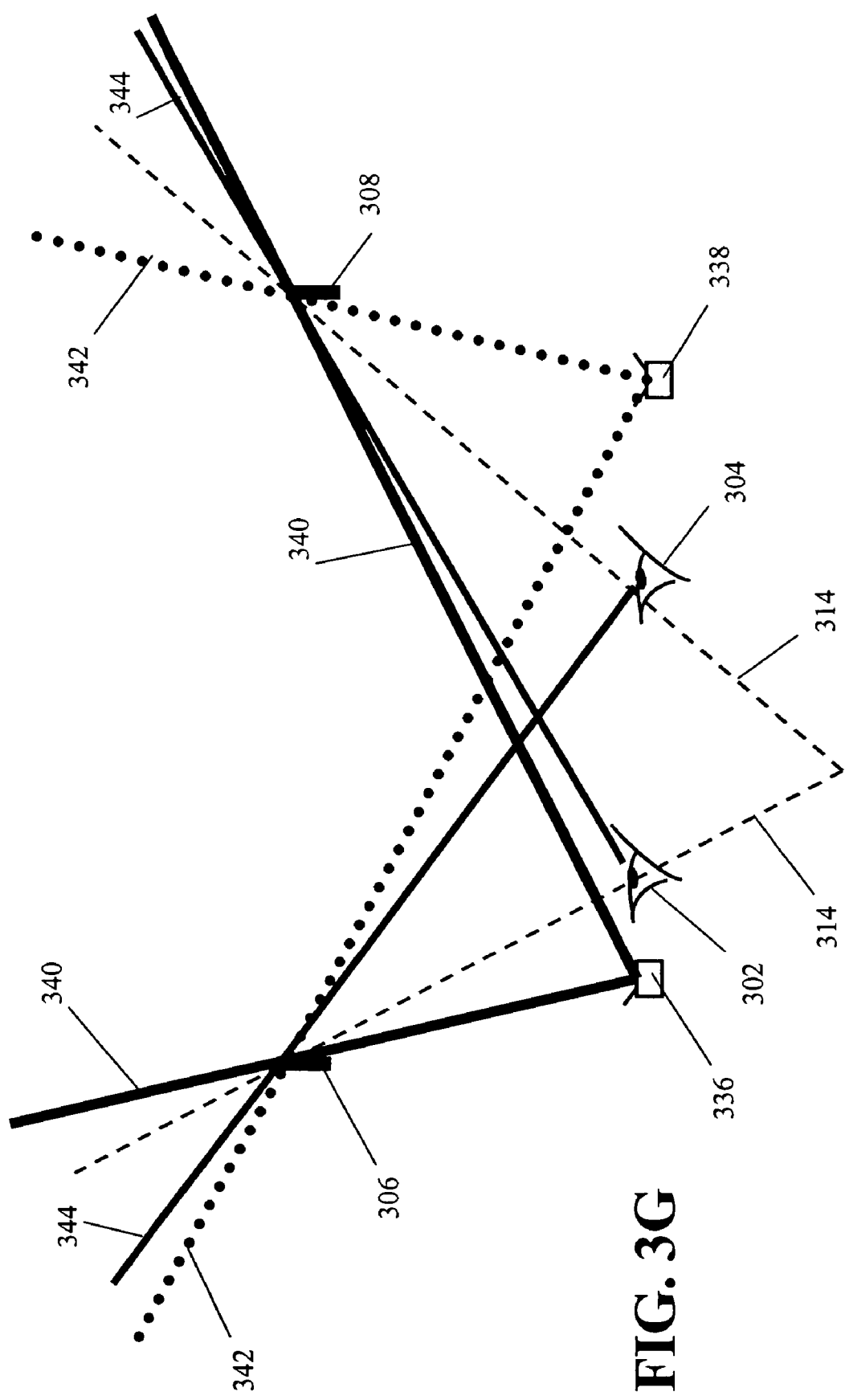

FIG. 3G shows the situation in which two cameras 336, 338 are mounted either side of the eyes 302, 304 and the scene delimited by a wide hand stance.

In FIG. 3G, the thick bold lines 340 mark out the delimited view from a camera 336 mounted to the left side of the eyes 302, 304. The thick dotted bold lines 342 mark out the delimited view from a camera 338 mounted on the right side of the eyes 302, 304. The thinner bold lines 344 mark out the maximum possible field of view of the scene as seen from the two eyes 302, 304. It is clear that neither the thick bold lines 340 or dotted thick bold lines 342 define fields of view that cover the entire user field of view defined by the thinner bold lines 344; i.e., neither picture from a camera set to these fields of view would capture all the objects selected by the person gesturing.

Figure 3H:
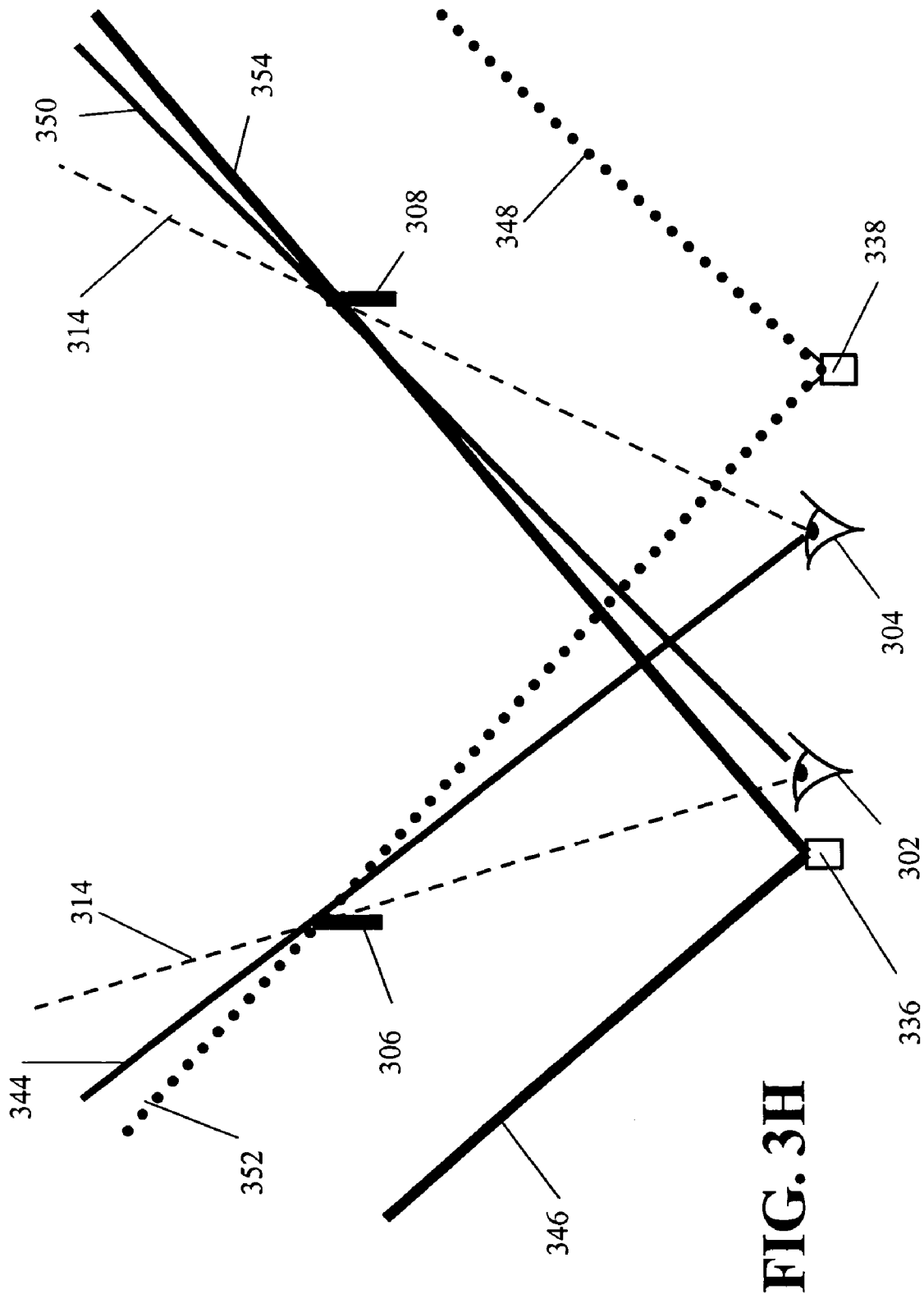

FIG. 3H shows how it is possible to control each camera 336, 338 so that it would capture the whole visible scene.

Here, the left going thicker bold line 346 (left limit of left camera 336) needs to be parallel to the left bold line 344 (left limit of view visible through the right eye 304) and the right dotted line 348 (right limit of right hand camera 338) needs to be parallel to the right going thinner bold line 350 (right limit of view visible through the left eye 302).

The left going dotted line 352 from the right camera 338 and the right going thicker bold line 354 from the left camera 336 show the inner boundary of the minimum field of view these need to point toward the hands 306, 308. This allows each camera 336, 338 to see everything in the scene beyond the hands 306, 308. This assumes that there is nothing of interest between the eyes 302, 304 and hands 306, 308.

This arrangement allows the two cameras 336, 338 to overlap for most of the delimited scene. Only delimited objects between the hands 306, 308 and eyes 302, 304 (close in) may be missed. This overlap is needed from both cameras 336, 338 so that depth information can be obtained over the scene.

As the two side cameras 336, 338 become closer to their respective eyes 302, 304, then this constraint does not end up forcing the cameras 336, 338 to have the same field of view as their respective eyes 302, 304. The parallel constraints forces them to have a larger field of view so that they can see part of the scene that is only seen from the other eye.

Figure 3I:
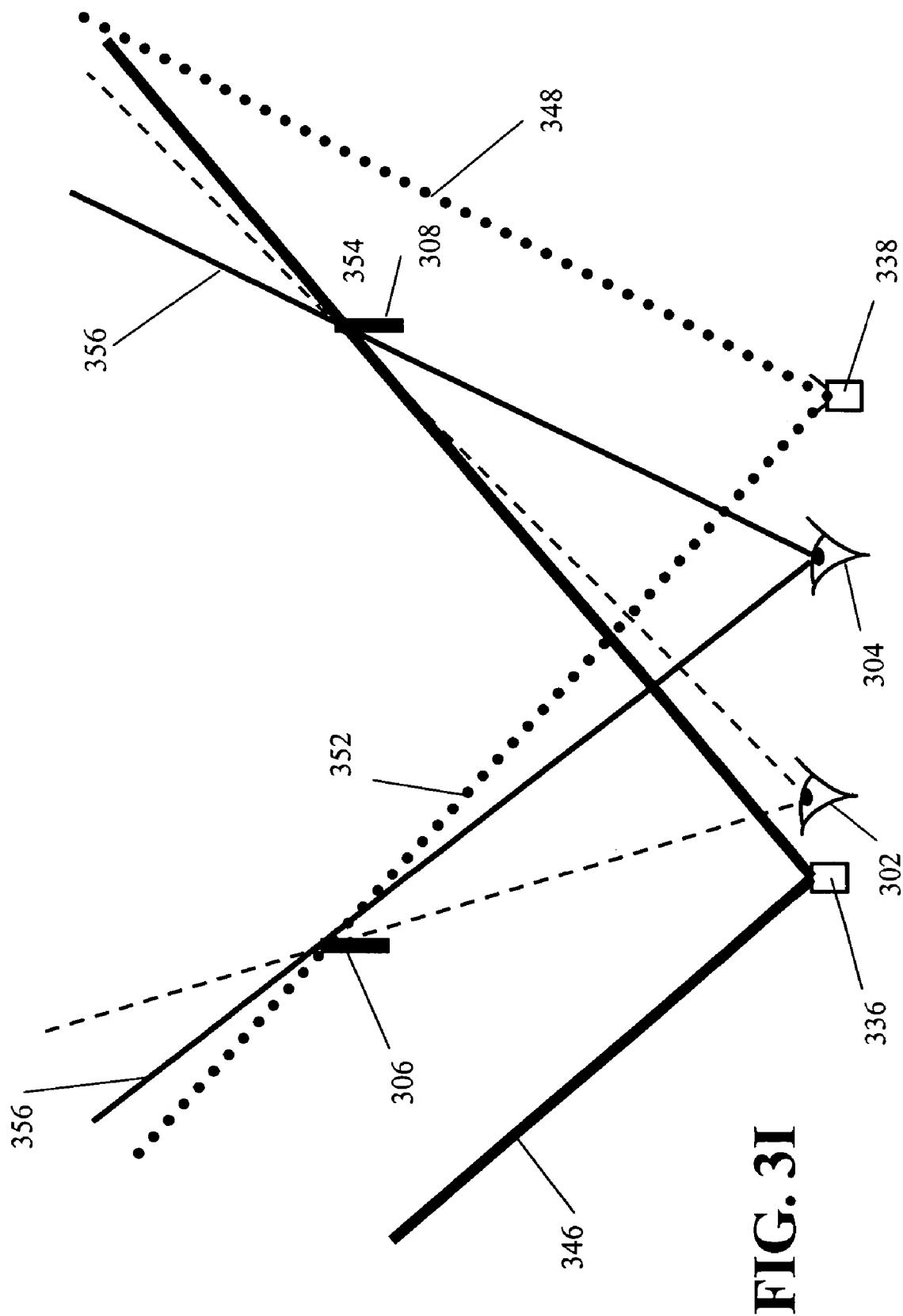

FIG. 3I shows the minimum fields of view for two side cameras when we have determined that the persons view is from a dominant right eye 304.

The thinner bold lines 356 coming from the right eye 304 delimit the field of view through the hands 306, 308 from the dominant right eye 304. The dotted lines 348, 352 delimit the minimum field of view needed from the right side camera 338. The thicker bold lines 346, 354 delimit the minimum field of view needed from the left side camera 336.

Here, the right hand dotted line 348 needs to be parallel to the right hand thinner bold line 356 (to ensure that all the scene delimited by the thinner bold lines 356 is captured). The leftmost thick bold line 346 cannot be set to capture all of the delimited scene, but it can be set to capture all of the delimited scene beyond a certain depth (in this case the hands 306, 308).

As can be seen the cameras 336, 338 can be adjusted so as to avoid the omission of possibly wanted scene information at the inevitable expense that some of the captured information is likely to be unwanted.

View synthesis can be viewed as consisting of firstly deciding how to synthesize a view of a scene from multiple camera viewpoints, and secondly acquiring the best pixel samples of the scene. The first depends on the analysis of the scene and the relative positions of the cameras 336, 338. The second requires control of the cameras 336, 338 to obtain samples of the scene at the highest resolution possible.

This analysis addresses the second part on the assumption that we know how to put these samples together to make the synthesized viewpoint. This analysis is broken by the problems of occluding objects which stop one view from seeing parts of the scene need for view synthesis.

The initial analysis shows how two cameras 336, 338 can capture the whole of a desired delimited field of view. Ideally, this requires the two cameras 336, 338 to be oriented in a cross-eyed fashion.

If the cameras 336, 338 cannot control their orientation then fine-tuning of the scene sampling is rarely possible (for a system of head mounted cameras). This is because the field of view is constrained to be symmetric about the camera orientation (which does not change).

Figure 3J:
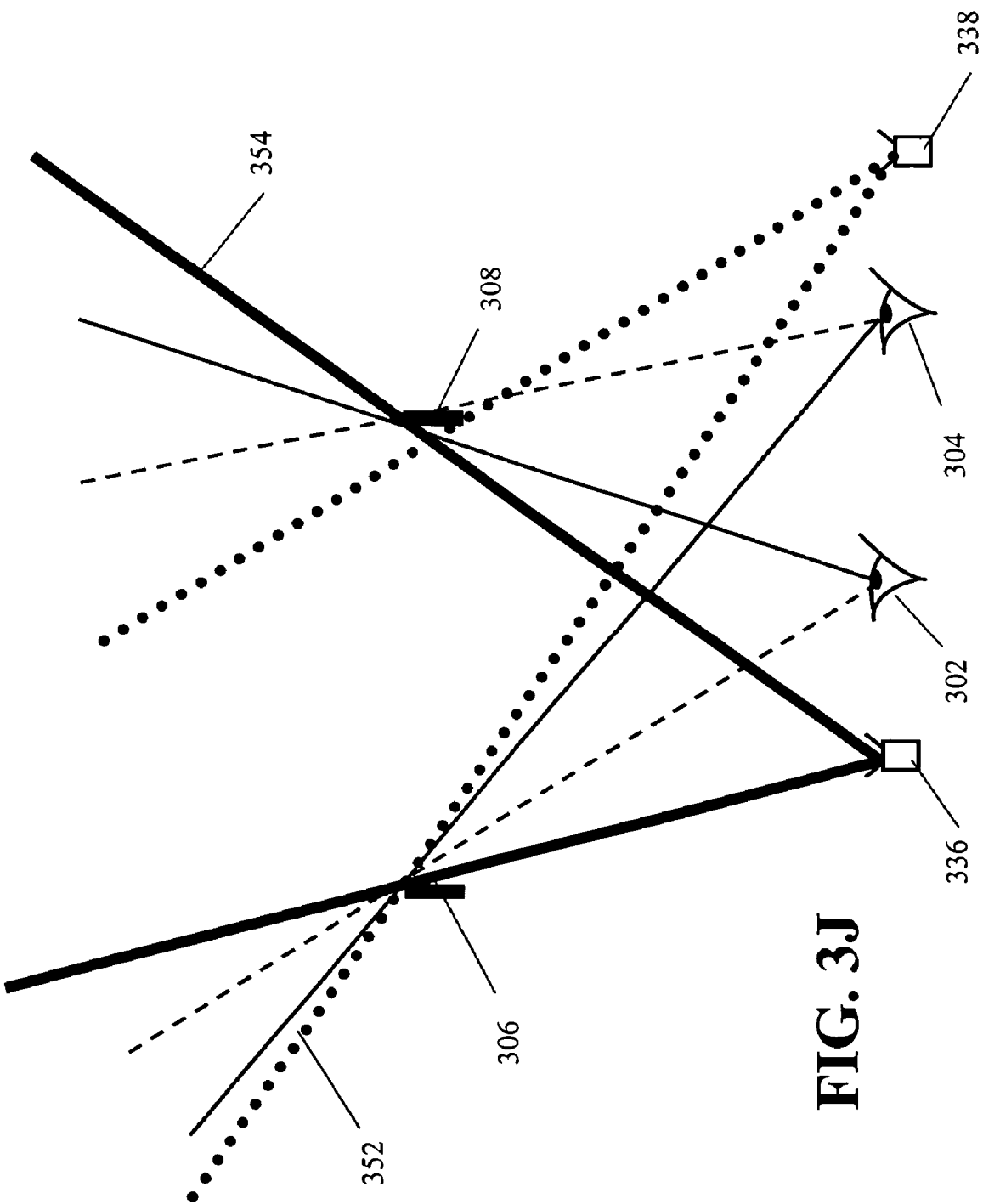

The arrangement shown in FIG. 3J is able to sample the whole of a scene using two cameras 336, 338 but is not optimum as there is too much overlap.

In this example with the region delimited by the hands 306, 308 to the left (slightly) it can be seen that the cameras 336, 338 need to be oriented in a cross-eyes fashion in order to make the best use of their own field of view.

The left camera's 336 right boundary 354 to its field of view is also the right boundary of the view captured by the dual camera system. Similarly the right camera 338 contributes the left boundary 352. Both these cameras 336, 338 need to be cross-eyed to provide the maximum field of view. The amount that the cameras 336, 338 need to be cross-eyed varies with the position of the hands 306, 308 and their spacing.

FIGS. 4A through 4E are referred to below in the context of scene delimitation. In particular, this section of the patent application discusses scene delimiting using framing objects. In the figures, for ease of explanation, a single user viewpoint (whether this be a single dominant eye viewpoint or composite or other synthesized viewpoint as discussed above) is shown and a single camera offset to the left is assumed.

When using hands 306, 308 (FIGS. 3A-3J) to frame a scene, the tendency is to use particular objects in the scene to delimit the region of interest. These objects either provide a natural line in the scene to crop against, or they are objects that are to be avoided (such as an unsightly chimney), or objects to be captured (such as a person or tree). These objects are either to be included or excluded from the delimited scene.

FIG. 4A shows an example of framing a scene by excluding particular objects. In this example it is assumed that the maximal field of view that excludes the framing objects is desired.

There are two framing objects (A and B) that it is desired to exclude from the scene. The solid lines 402, 404 from the eye 406 denote the view that the person wishes to delimit (we represent it as a single camera 410). The solid lines 402, 404 are chosen to ensure that the framing objects A and B are excluded from the field of view seen by the person (the user field of view). The bold lines 412, 414 emanating from the camera 410 denote the view of a camera 410 controlled in a way which we have advocated for capturing the whole delimited scene. The left bold line 412 is set parallel to the left solid line 402, and the right bold line 414 is drawn through the point indicated by the right hand (not shown). The broken lines 416, 418 denote an alternative delimited view from the perspective of the offset camera 410. Under certain assumption this broken line field of view is probably the view intended for the offset camera 410. This broken line field of view excludes the two framing objects A and B. This is assumed to be the major intention. As a result of the camera 410 being offset to the left of the eye's 406 viewpoint. Before the framing objects A and B, this broken line field of view contains some extra parts of the scene on the left and less of the scene on the right. After the framing of objects A and B the situation is reversed, on the left parts of the delimited scene are omitted, whilst on the right extra parts of the scene are included.

If the camera 410 were offset behind the eye viewpoint then the effect would be to increase the field of view in front of the framing objects A and B. This both exacerbates the extra and diminishes the lost field of view in front of the framing objects A and B. However the field of view behind the framing objects A and B is decreased. Thus having the opposite effect behind the framing objects A and B.

The assumption is that these omissions and additions are not significant. This depends on how the camera 410 is offset from the person's actual viewpoint.

It should be observed that the bold line delimited field of view (the only view guaranteed to capture all the delimited scene (beyond the hands)) is very wasteful. It captures lots more of the scene than would have been intended.

There is not so much wasted field of view on the left. Thus we could avoid finding the depth of the left framing object A (because our camera 410 is offset to the left).

Figure 4B:
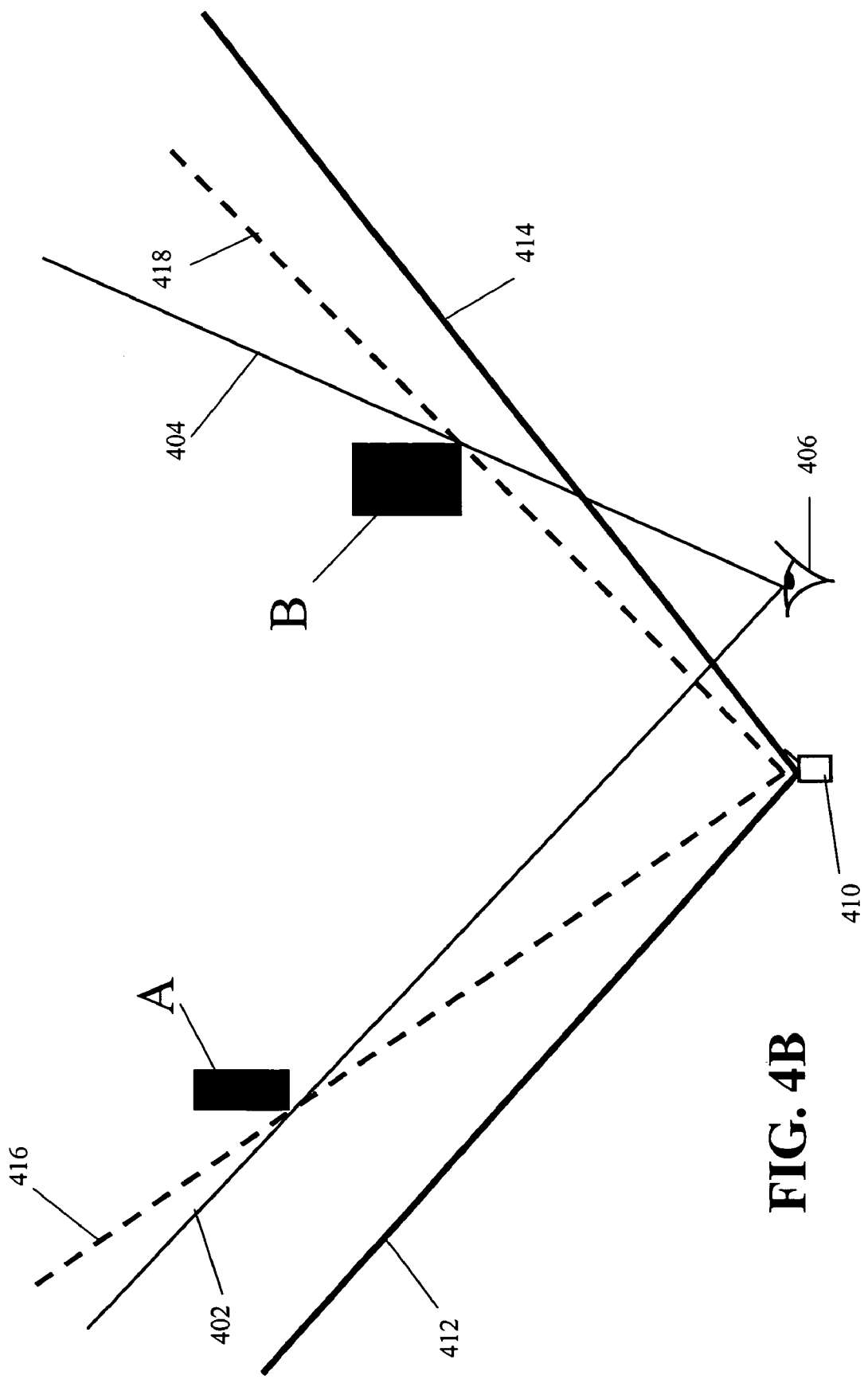

In FIG. 4B there is given an example of framing a scene using objects that must be included in the scene. We want the minimal field of view that contains the framing objects.

There are two framing objects (A and B) that it is desired to include from the scene. The solid lines 402, 404 emanating from the eye 406 once again denote the view that the person wishes to delimit. Here, the solid lines 402, 404 are chosen to ensure that the framing objects are included from the field of view seen by the person, while the bold lines 412, 414 emanating from the camera 410 denote the view of a camera controlled in a way which we have advocated for capturing the whole delimited scene. The left bold line 412 is set parallel to the left solid line 402, and the right bold line 414 is drawn through the point indicated by the right hand (not shown). The broken lines 416, 418 denote an alternative delimited view from the perspective of the offset camera 410. Under certain assumption this broken line delimited field of view is probably the view intended for the offset camera 410 and includes the two framing objects A and B (assumed to be the major intention).

Once again due to the camera 410 being offset from the person's field of view, parts of the person's viewpoint are missing and other parts added that were not present. This happens in the same way as with exclusion framing.

In front of the framing objects A and B, the broken line delimited field of view contains some extra parts of the scene on the left and less of the scene on the right. In contrast, behind the framing objects A and B the situation is reversed, on the left parts of the delimited scene are omitted, whilst on the right extra parts of the scene are included.

Actually with inclusion framing we are likely to include a boundary around each object A and/or B for aesthetic reasons. The person gesturing would probably have done this and we have to cope with detecting framing objects that are not exactly inline with the persons field of view.

Another way of distinguishing exclusion framing from inclusion framing is the effect of choosing the wrong object distance for the framing object.

Figure 4C:
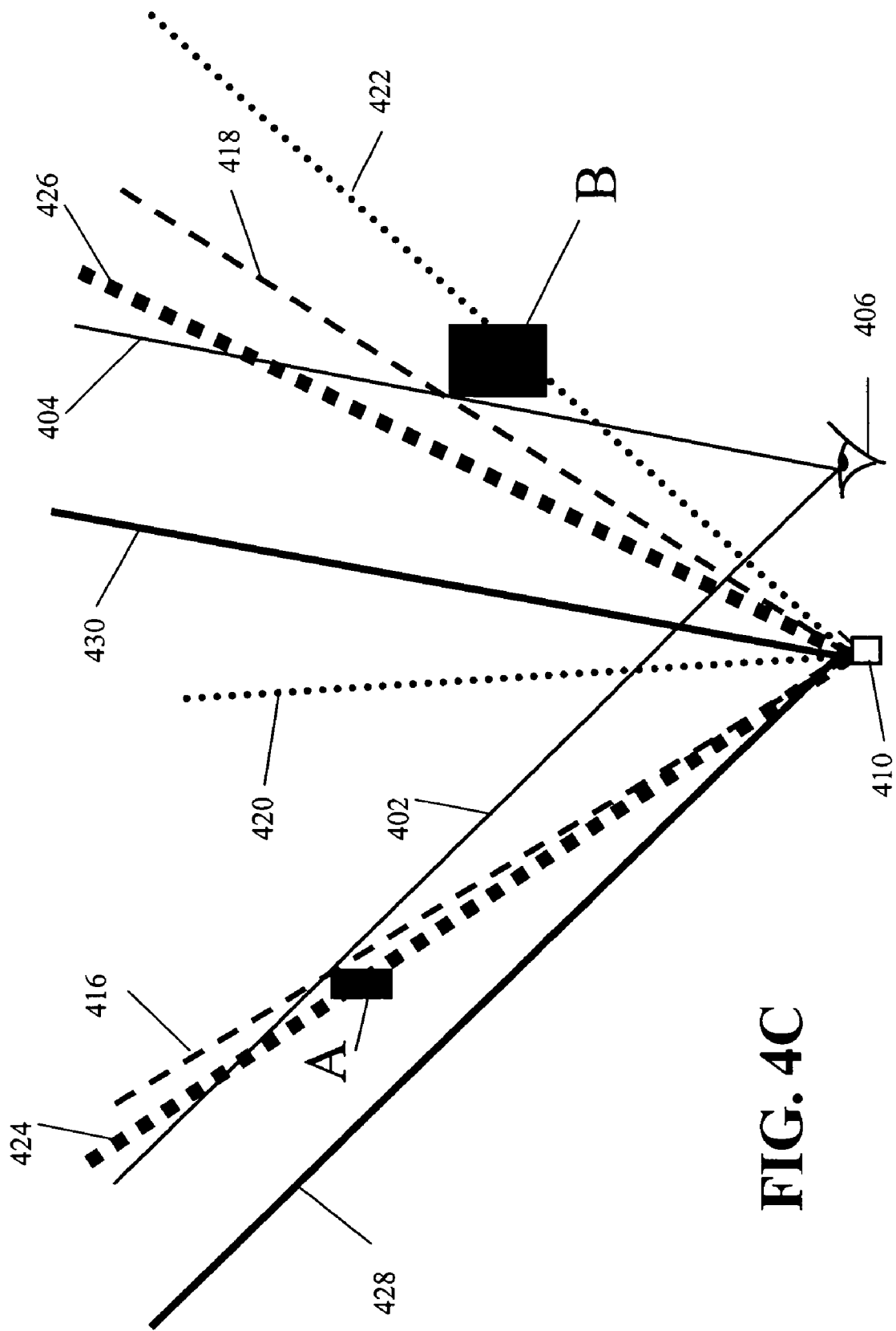

In FIG. 4C we show an example in which a distance is chosen for the framing object B that is closer than the actual distance, further away than the object distance, and at infinity.

The solid lines 402, 404 show the field of view delimited by the person. The broken lines 416, 418 show the field of view if the exact distance for the framing objects A and B is used. The broken lines 416, 418 intersect the solid lines 402, 404 where the framing objects A and B touch them. The dotted lines 420, 422 denote the field of view if the framing objects A and/or B are considered to be closer than they actually are.

The dotted lines 420, 422 intersect the solid lines 402, 404 at a point before the framing objects A and B. The square dotted lines 424, 426 denote the field of view obtained if the framing objects A and B are considered to be further away than they are. The square dotted lines 424, 426 intersect the solid lines 402, 404 behind the actual framing objects A and B. The solid bold lines 428, 430 emanating from the camera 410 show the field of view obtained if the framing objects A and B are considered to be at infinity. This produces solid bold lines 428, 430 that are parallel to their corresponding solid lines 402, 404 emanating from the eye 406 (they never intersect).

These solid bold lines 428, 430 provide a shifted version of the users field of view (as denoted by the solid lines 402, 404 emanating from the eye 406). A camera 410 with this field of view and a scene at infinity will see the same image as a camera at the position of the person's viewpoint. The solid bold lines 402, 404 provide one half of the "guaranteed" capture field of view which would use the left solid bold line 428 and a line through the hands (not shown). The line through the hands ensures all the scene will be captured but is wasteful. The hands are a particularly poor estimation of the depth of the framing object.

It is clear that we could generalise the use of the depth of the hands for a framing object in the guaranteed capture mode to use any depth along the solid lines 402, 404 before which it is okay to assume that there is nothing of interest within the scene. There could be several modes of using the camera 410 whereby different estimates for this depth could be used.

For a camera 410 offset to the left, these distant lines have different characteristics for the left and right.

If the depth of the framing objects A and/or B is underestimated (round dotted lines 420, 422) then on the right of the scene this causes a field of view to encroach upon the framing object. In the FIG. 4C the right lines go through the framing object A. On the left the field of view captures less of the scene. So on the left side it still ensures that the framing object is excluded.

If the depth of the framing objects A and/or B is overestimated (square dotted lines 424, 426) the on the right of the scene this causes a field of view that captures less of the scene and so ensures that the object B will be excluded. On the left this causes a field of view to encroach upon the framing object A.

Thus for exclusion framing with a camera 410 offset to the left of a persons viewpoint as shown in FIG. 4C, it is okay to use an estimate for the framing objects depth that is too large on the right and too small on the left. This ensures that a field of view that does not encroach upon any of the framing objects A or B.

On the right side therefore, a practical solution involving no depth estimates for the framing objects A and/or B would be to assume an infinite depth for the right framing object B. Alternatively one could assume a maximum distance beyond which all framing objects would lie.

On the left an estimate that also took an infinity as an estimate would not be too damaging because the difference between any of the fields of view is slight. This would be cleaned up by slight auto-cropping with the limited objective of removing isolated objects A and/or B.

Figure 4D:
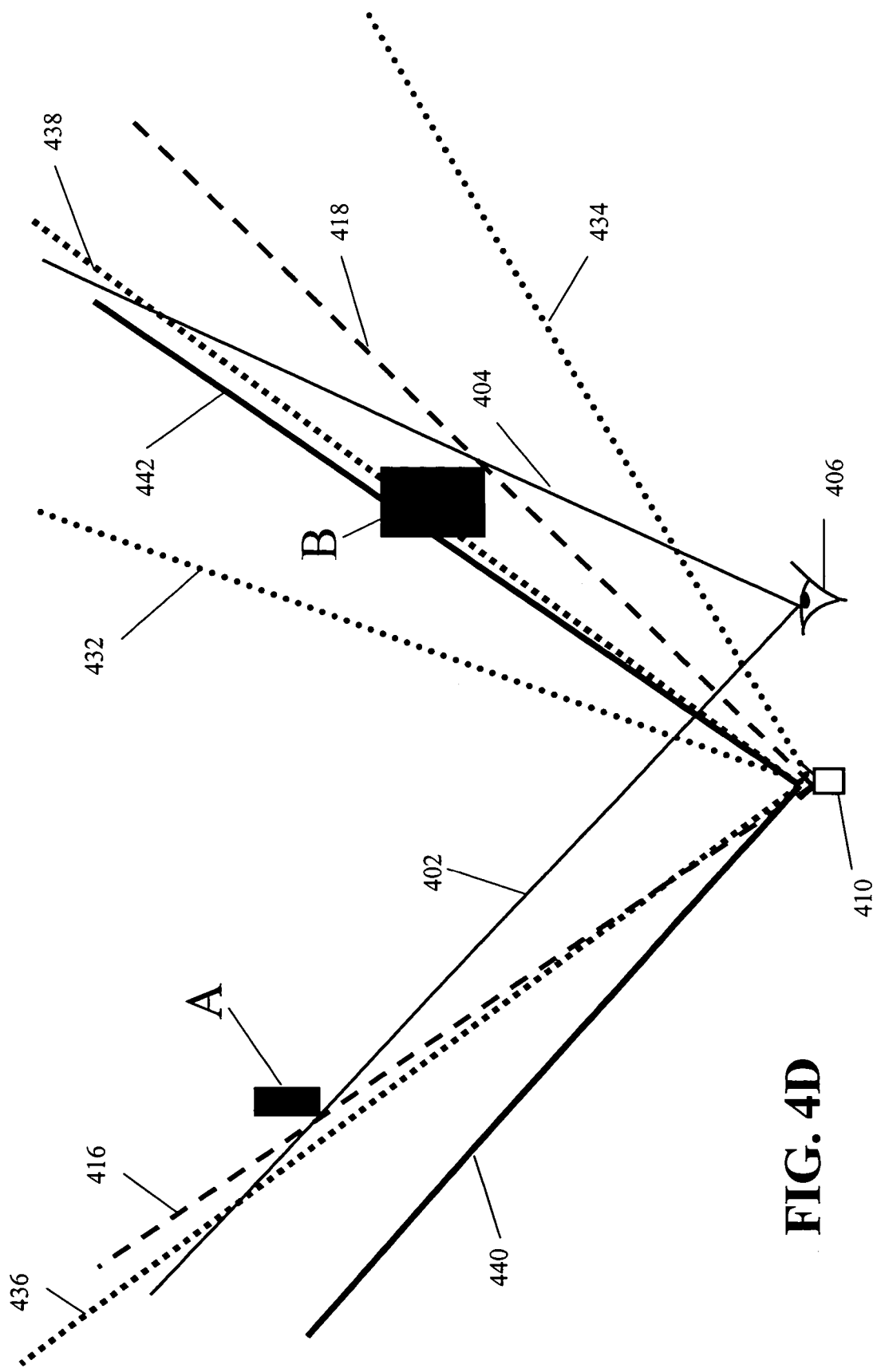

We now discuss in relation to FIG. 4D the effect of using inaccurate distance estimation for the framing object when we are using inclusion framing.

The solid lines 402, 404 show the field of view of the user. The broken lines 416, 418 show the field of view if the exact distance for the framing objects A and B is used. The broken lines 416, 418 intersect the solid lines 402, 404 where the framing objects A and B touch them. The dotted lines 432, 434 denote the field of view if the framing objects A and/or B are considered closer than they actually are. The dotted lines 432, 434 intersect the solid lines 402, 404 at a point before the framing objects A and B. The square dotted lines 436, 438 denote the field of view obtained if the framing objects A and/or B are considered further away than they are. The square dotted lines 436, 438 intersect the solid lines 402, 404 behind the actual framing objects A and B. The solid bold lines 440, 442 emanating from the camera 410 show the field of view obtained if the framing objects are considered to be at infinity. This produces solid bold lines 440, 442 that are parallel to their corresponding solid lines 402, 404 (they never intersect).

As before, the solid bold lines 402, 404 provide a shifted version of the user field of view.

For a camera 410 offset to the left, these distant lines have different characteristics for the left and right.

Underestimating the depth of a framing object (round dotted lines 432, 434) means that on the right the field of view moves further away from the framing object. Thus ensuring that the framing object is still included. On the left the field of view captures less of the scene causing it to encroach upon the framing object and so fails to include all of the framing object.

If the depth of the framing object is set too large (square dotted lines 436, 438) then on the right this causes a field of view that captures less of the scene and causes the framing object not to be totally included. On the left this causes a field of view to be larger and so still ensures that the framing object is included.

Thus for inclusion framing it is okay to use an estimate for the framing objects depth that is too large on the left and too small on the right. This ensures that a field of view that always includes the framing objects A and/or B.

On the left a practical solution involving no depth estimates for the framing objects A and/or B would be to assume an infinite depth for the left framing object A. But this is the approach suggested in the simple guaranteed capture mode.

On the right the practical approach is to assume a distance beyond which the scene of interest is assumed to lie. This essentially is the approach of the generalised guaranteed capture mode.

Figure 4E:
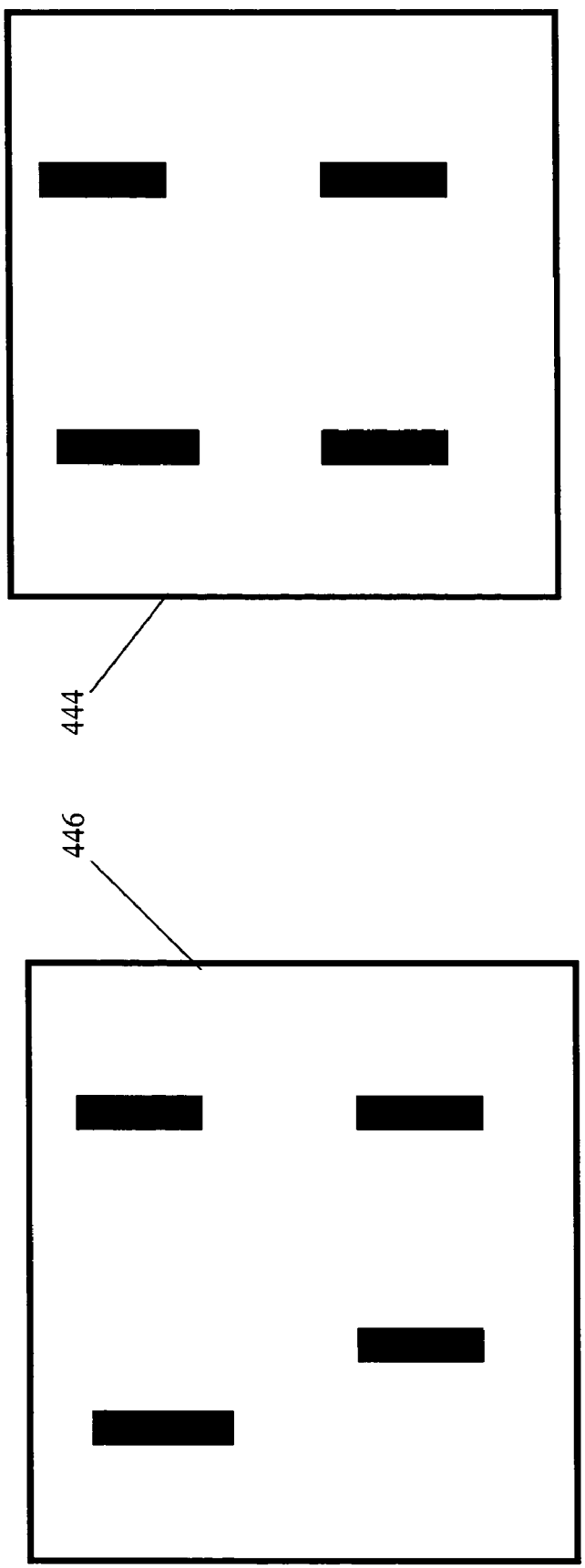

In FIG. 4E, the effects of using composite framing objects are considered. In the figure, the image 444 shown on the right hand side is the image seen by the viewer, whilst the image 446 to the left side is a view from a camera offset to the left hand side of the viewer.

Often in a scene several objects at different depths will align in the perspective of the person delimiting the scene. They will provide a useful line for delimiting the scene. Thus instead of using a single object to frame the scene we are in effect using several objects at different depths.

This presents problems whenever the camera is offset from the person's viewpoint.

The effects of parallax as demonstrated in FIG. 4E mean that the fortuitous alignment of the objects will not occur in the camera's viewpoint.

Considering a camera offset to the left of the person's viewpoint. In the image on the left the nearer framing objects will have moved to the right more than the further objects.

The offset camera cannot really capture the picture as it was seen by the person.

On the right, if we are trying to exclude the framing objects, then we must pick a field of view excluding the innermost images of the right framing objects. In this case (a camera offset to the left) it will be the furthest right framing object.

On the left, if we are trying to exclude the framing objects, then we must pick a field of view excluding the innermost images of the left framing objects. In this case (camera offset to the left) it will be the closest left framing object.

On the right, if we are trying to include the framing objects, then we must pick a field of view including the images of the outermost right framing objects. In this case (a camera offset to the left) it will be the nearest framing object.

On the left, if we are trying to include the framing objects, then we must pick a field of view to include the images of the outermost left framing object. In this case (camera offset to the left) it will be the farthest left framing object.

With exclusion framing it is possible to exclude the entire scene.

It is possible to use inclusion framing with one side and exclusion framing for the other side.

Figure 5A:
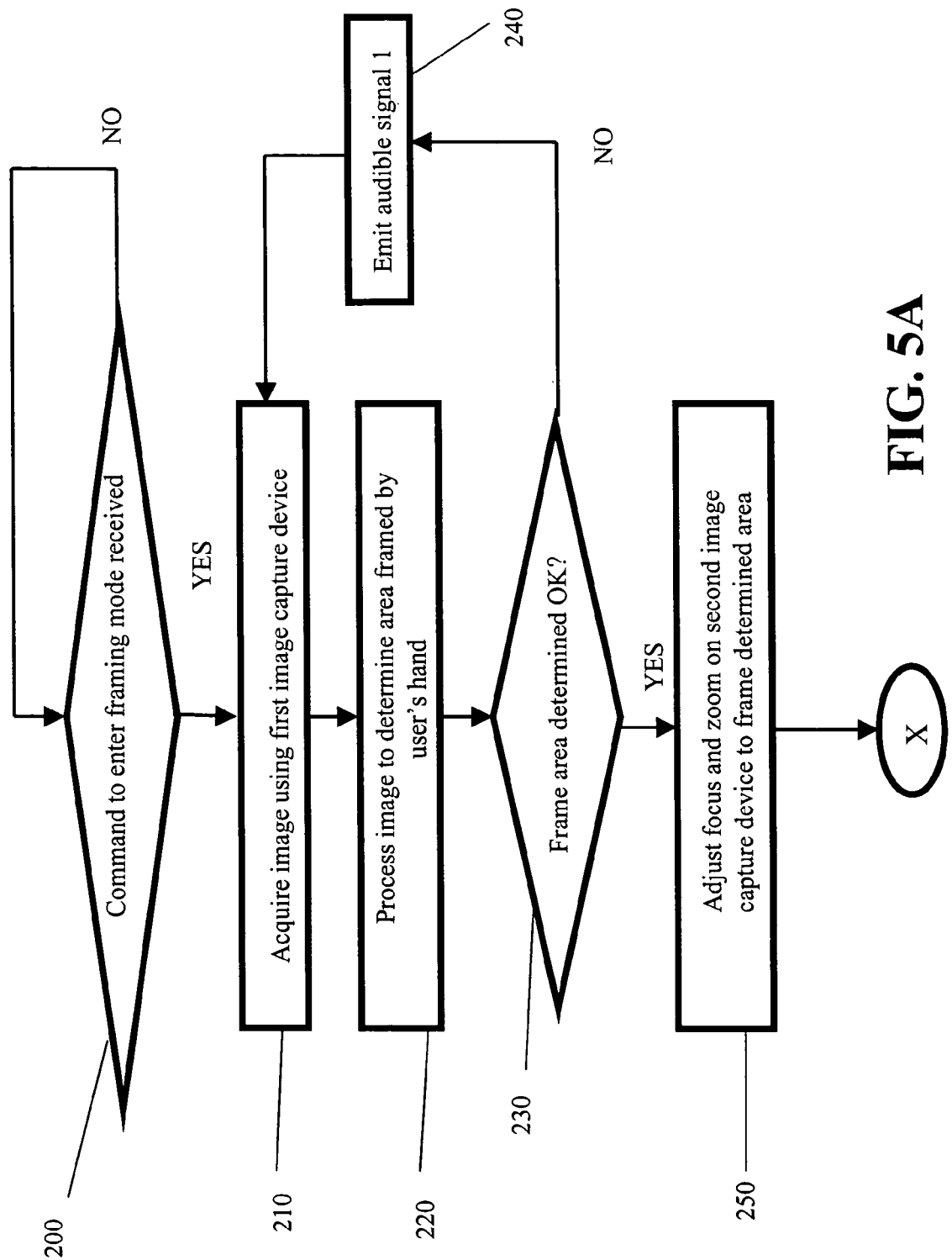
FIGS. 5A and 5B show a flow chart illustrating the capture of an image according to an embodiment.
Figure 5B:
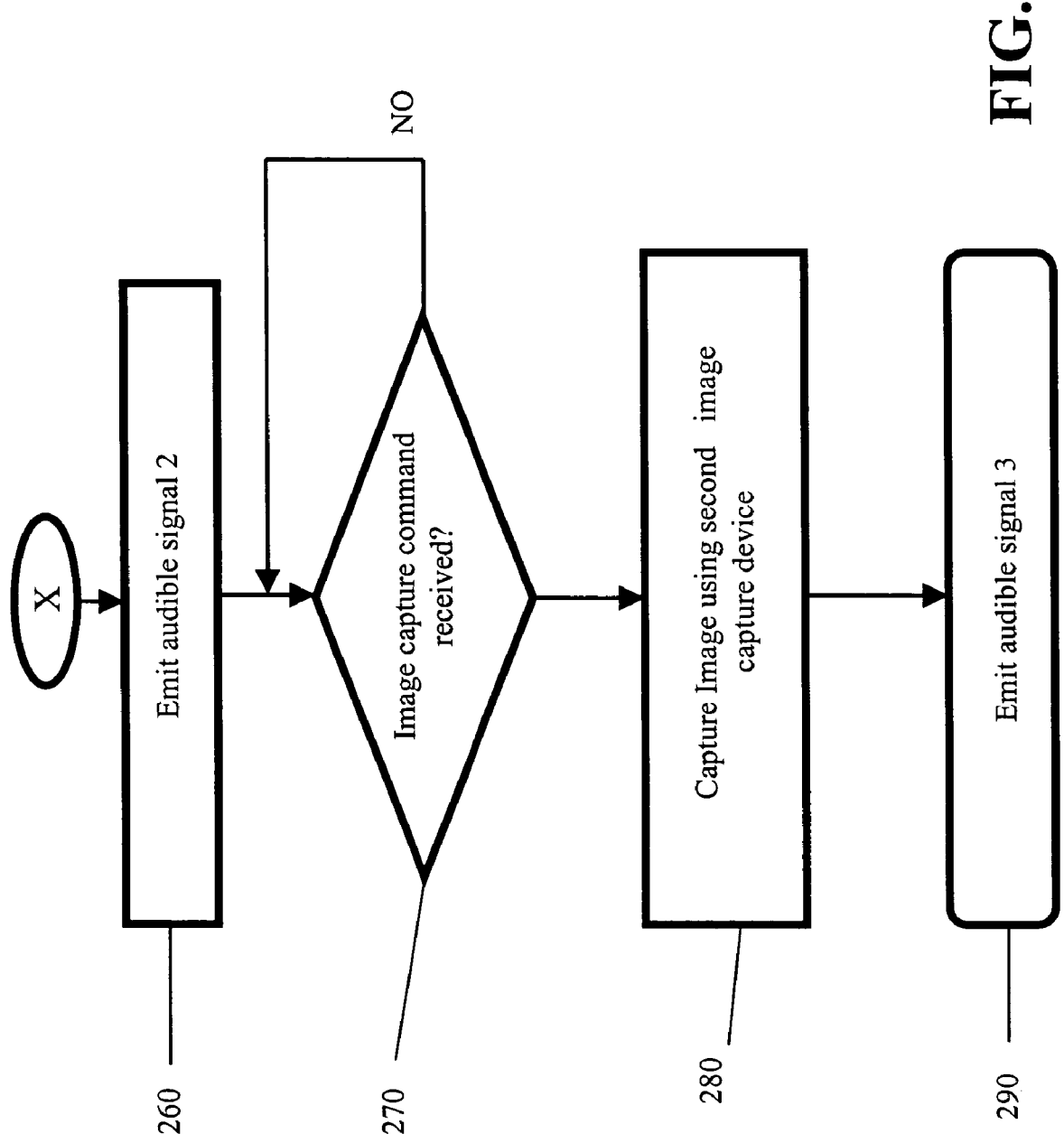

FIGS. 5A and 5B represent a flow chart showing a simplified method of controlling the field of view.

Firstly, at step 200, a check is made continuously until it is determined that a command to enter the framing mode has been received. Such a command could be input through any user interface, but it is preferably input to the camera using speech recognition so as to allow hands free operation of the camera.

Subsequently, it is assumed that the user then frames the area 130 (FIG. 1) including the desired field of view using both hands, as for instance shown in FIG. 2B. The first image capture device 122 (FIG. 1) then captures an image of this framing motion/gesture (step 210).

The captured image is subsequently processed by the camera image processing unit in an attempt to determine the area 130 framed by the users hands (step 220).

A check is then made so as to determine whether the image was successfully processed so as to determine the framed area (step 230). Appropriate feedback is given to the user using a feedback unit. In this preferred embodiment, the feedback unit emits audible signals indicative of the outcome or progress of an operation. If image processing (step 220) was not successful, then an audible signal is emitted (step 240) and an attempt made to acquire a new image (step 210) containing the necessary framing information.

If the image processing (step 220) was successful, with the framed area being determined, then the focus and zoom on the second image capture device is adjusted so as to ensure that the image within the area framed by the user lies within the field of view of the second image capture device (step 250). Subsequently, an audible signal is emitted to indicate the success of step 250 (step 260). The camera then checks whether an image capture command has been received (step 270).

Once the image capture command has been received (which in this instance, is input using an appropriate speech recognised key word), then the second image capture device 124 (FIG. 1) captures an image utilising the desired field of view (step 280), with the camera emitting an audible signal once the image has been captured (step 290).

It will be appreciated that the above embodiments have been described by example only, and various alternatives will be apparent to the skilled person that will within the scope of the disclosure.

For instance, whilst the camera has been described as a head mounted camera, it will be appreciated that various embodiments can be applied to any camera, although it is most appropriate for wearable cameras.

Equally, whilst first and second image capture devices have been described, it will be appreciated that a single image capture device could be utilised instead of two separate devices. Any of the image capture devices utilised can be statically fixed with respect to the body of the camera, or alternatively may be re-orientated by respective actuators.

Whilst the preferred embodiment compensates for parallax between different viewpoints of the image capture devices and the view of the user, an alternative embodiment assumes that the image viewed through the area 130 (FIG. 1) from the prospective of the camera is the image which should be within the captured field of view. In other words, the user should, where necessary, attempt to compensate manually for parallax by adjusting the position of his or her hands.

Equally, while distance $d_1$ is calculated in the preferred embodiment by comparing the size of the hands of a user in an image, then such a distance could be measured using alternative means e.g. an ultrasonic range finder. Alternatively, it can be assumed that the distance $d_1$ from the user to the area 130 (FIG. 1) defined by the users hands is a constant (preferably calibrated by a user) predetermined value.

Whilst the above embodiment indicates a camera including the apparatus required for determining an area framed by the hands of a user, it will be appreciated that such apparatus could be implemented as a separate control device, and arranged to provide signals to a camera indicative of the framed area, once the framed area has been determined.

Whilst it is assumed that the zoom of the second image capture device is adjusted to ensure that the desired image lies within the field of view, equally various embodiments can be utilised to control the optical properties of the image captured within a field of view. For instance, the field of view of the second image capture device could be fixed. The area framed (or otherwise defined) by the user can be used to determine the properties with which the image is to be captured. For instance the light and dark maximum and minimum associated with the image scene, or the speed of objects moving within the image scene, or the subsequent control of the aperture (or, in the case of digital cameras, the calibration of the CCD brightness level) or the time taken to capture a single image (e.g., the speed of operation of the shutter in an analog camera).

Figure 6:
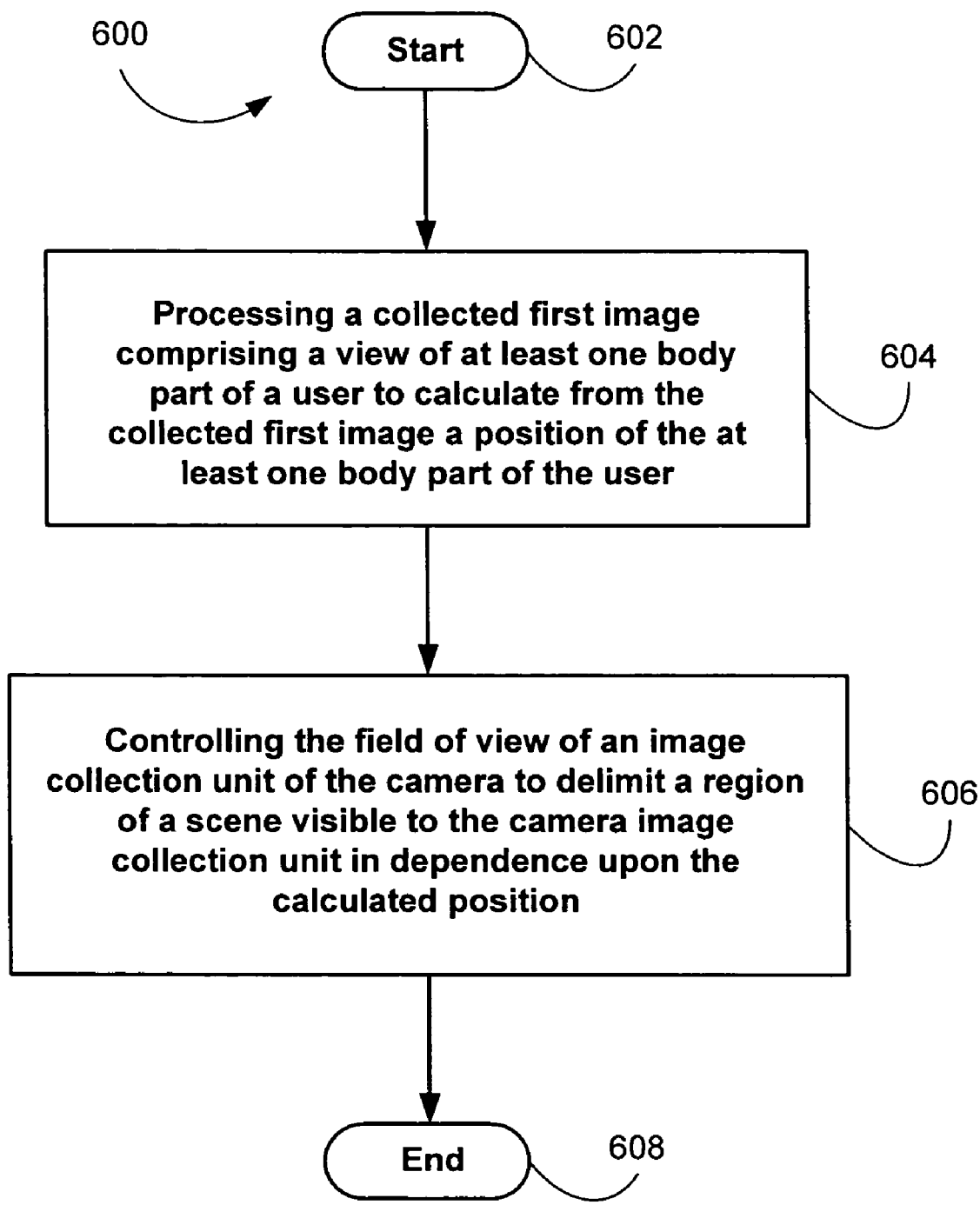
FIG. 6 is a flowchart illustrating an embodiment of a process for controlling a field of view of a camera.

FIG. 6 is a flowchart illustrating an embodiment of a process for controlling a field of view of a camera. The flow chart 600 of FIG. 6 shows the architecture, functionality, and operation of an embodiment for implementing the processing means 110 and/or control means 115 (FIG. 1) such that a field of view of a camera is controlled. An alternative embodiment implements the logic of flow chart 600 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIG. 6, or may include additional functions. For example, two blocks shown in succession in FIG. 6 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process starts at block 602. At block 604, a collected first image is processed, the first image comprising a view of at least one body part of a user to calculate from the collected first image a position of the at least one body part of the user. At block 606, the field of view of an image collection unit of the camera is controlled to delimit a region of a scene visible to the camera image collection unit in dependence upon the calculated position. The process ends at block 608.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The various embodiments are not restricted to the details of the foregoing embodiment(s). The various embodiments extend to any novel one, or any novel combination, of the features disclosed in this specification (including any accompanying claims, abstract and drawings), or to any novel one, or any novel combination, of the steps of any method or process so disclosed.

What is claimed:

1. A camera comprising:
   a first image collection unit arranged to collect at least a first image comprising a view of at least one body part of a user;
   an image processing unit arranged to process the collected first image so as to recognise from the collected first image a position of the at least one body part of the user; and
   a control unit arranged to control a field of view of a second image collection unit of the camera to delimit a region of a scene visible to the second image collection unit in dependence upon the recognised position and to exclude a specific object from the field of view of the second image collection unit if the image processing unit recognizes that the user is deliberately occluding the specific object.

2. The camera of claim 1, wherein the collected first image includes a hand of the user and the image processing unit is arranged to recognise hand gestures based upon recognised orientation/positioning of the hand and fingers.

3. The camera of claim 2, wherein dependant upon the recognised hand gesture, the control unit is arranged to control a respective camera setting in a specific manner.

4. The camera of claim 3, wherein the camera settings may comprise one or more of the following camera settings: focus, zoom, aperture, exposure, white balance.

5. The camera of claim 1, wherein dependant upon the recognised hand gesture, the control unit is arranged to control the second image collection units to capture an image of a specific object within the field of view of the second image collection unit.

6. The camera of claim 1, wherein the control unit is further arranged to control one or more settings of a plurality of second image collection unit based on the recognised position.

7. The camera of claim 5, wherein the settings may comprise one or more of the following camera settings: focus, zoom, aperture, exposure, white balance.

8. The camera of claim 1, wherein the control unit is arranged to control the second image collection unit to capture an image of a specific object within the field of view of the second image collection unit if the image processing unit recognises that the user is deliberately occluding the specific object.

9. The camera of claim 1, wherein the control unit is arranged to control the second image collection unit to align a border of the delimited region with a specific object within the field of view of the second image collection unit if the image processing unit recognises the specific object as a framing object.

10. A control device for controlling a camera comprising:
    a first image collection unit arranged to collect at least a first image comprising a view of at least one body part of a user;
    an image processing unit arranged to process the collected first image so as to recognise from the collected first image a position of the at least one body part of the user; and
    a control unit arranged to control a field of view of a second image collection unit of the camera to delimit a region of a scene visible to the second image collection unit in dependence upon the recognised position wherein the control unit is arranged to control the second image collection unit to align a border of the delimited region with a specific object within the field of view of the second image collection unit if the image processing unit recognises the specific object as a framing object and wherein the control unit is arranged to control the second image collection unit to exclude the framing object from the delimited region.

11. The camera as claimed in claim 1, wherein the image processing unit is arranged to compensate for parallax between the first image collection unit and a viewpoint of the user, so as to determine an area defined by the positions as viewed from the perspective of the user.

12. The camera of claim 11, wherein the parallax compensation comprises designating one of an eye of the user as a dominant eye and assuming the user's viewpoint to be a single viewpoint as seen from the dominant eye.

13. The camera of claim 11, wherein the parallax compensation comprises assuming a single viewpoint from a position intermediate two eyes of the user.

14. A control device for controlling a camera comprising:
    a first image collection unit arranged to collect at least a first image comprising a view of at least one body part of a user;
    an image processing unit arranged to process the collected first image so as to recognise from the collected first image a position of the at least one body part of the user; and
   a control unit arranged to control a field of view of a second image collection unit of the camera to delimit a region of a scene visible to the second image collection unit in dependence upon the recognised position
    wherein the image processing unit is arranged to compensate for parallax between the first image collection unit and a viewpoint of the user, so as to determine an area defined by the positions as viewed from the perspective of the user wherein a pair of viewpoints, each located at a respective eye of the user are assumed and a desired field of view of the second image collection unit is calculated based upon the field of view visible from each eye as delimited by recognised hand gestures of the user.

15. A control device for controlling a camera comprising:
    a first image collection unit arranged to collect at least a first image comprising a view of at least one body part of a user;
    an image processing unit arranged to process the collected first image so as to recognise from the collected first image a position of the at least one body part of the user; and
    a control unit arranged to control a field of view of a second image collection unit of the camera to delimit a region of a scene visible to the second image collection unit in dependence upon the recognised position wherein the image processing unit is arranged to compensate for parallax between the first image collection unit and a viewpoint of the user, so as to determine an area defined by the positions as viewed from the perspective of the user wherein a pair of viewpoints, each located at a respective eye of the user are assumed and a plurality of second image collection units are provided, the plurality of second image collection units being arranged to capture a totality of the possible field of view of the user as viewed from each eye and delimited by gestures of the user.

16. The camera according to claim 1, wherein during set-up procedures of the camera when composing a desired picture an object selection procedure is performed during which gestures of the user are captured by the first image collection unit and analyzed by the image processing unit with the view to recognising which object or objects are intended for selection by the user so as to include or exclude such object or objects from the field of view of the second image collection unit.

17. The camera according to claim 16, wherein the object or objects recognised as intended for selection by the user are used to frame the field of view of the second image collection unit.

18. The camera as claimed in claim 1, wherein the camera is a wearable camera.

19. The camera as claimed in claim 18, wherein the camera is arranged for mounting on at least one of a head, a finger, a hand, a shoulder and an arm.

20. The camera as claimed in claim 1, further comprising a distance determining unit arranged to determine distance between the first image collection unit and the body part.

21. The camera as claimed in claim 20, wherein the distance determining unit is arranged to determine the distance by determining size of at least a portion of the body part, and corn paring this determined size with a calibration value.

22. The camera as claimed in claim 20, wherein the distance determining unit comprises a distance measuring device arranged to determine the distance by measuring a signal transmitted from or reflected by at least the portion of the body part.

23. The camera as claimed in claim 1, wherein the control unit is arranged to control the field of view of the second image collection unit so as to enable the capture of an image lying within an area of the first image as defined by the recognised position or positions of the body part or parts of the user.

24. The camera as claimed in claim 1, wherein the control unit controls the field of view by adjusting at least one of a digital zoom and an optical zoom of the second image collection unit.

25. The camera as claimed in claim 1, wherein the control unit is arranged to control the field of view by controlling at least one of a horizontal movement, a vertical movement and a rotation of the second image collection unit.

26. The camera as claimed in claim 1, wherein the control unit is arranged to control an aspect ratio of the field of view.

27. The camera as claimed in claim 1, wherein the image processing unit is arranged to determine an image lying as viewed through a defined area, and to process the image so as to determine at least one of: distance to at least one object within the image; speed of movement of the at least one object, within the image; brightness of at least the portion of the image; depth of field of the at least one object within the image; and light sources within the image; wherein the control unit is arranged to control image collection properties of the second image collection unit independence upon a determined property.

28. The camera as claimed in claim 1, wherein the second image collection unit is the first image collection unit 29. A control device for controlling a camera, the device comprising:
    a first image collection unit arranged to collect at least a first image comprising a view of at least one body part of a user; and
    an image processing unit arranged to process the collected first image so as to recognise from the collected first image a position of the at least one body part of the user; and
    a signal generation unit arranged to generate a signal suitable for control of a field of view of a second image collection unit of the camera to delimit a region of a scene visible to the first image collection unit in dependence upon the recognised position and to exclude a specific object from the field of view of the second image collection unit if the image processing unit recognizes that the user is deliberately occluding the specific object.

30. The control device as claimed, in claim 29, wherein the device further comprises a signal transmission unit arranged to transmit at least one of a wireless signal and a medium guided signal for transmission of the signal to the camera.

31. A method of controlling a field of view of a camera, the method comprising:
    processing a collected first image comprising a view of at least one body part of a user to calculate from the collected first image a position of the at least one body part of the user; and
    controlling the field of view of an image collection unit of the camera to delimit a region of a scene visible to the camera image collection unit in dependence upon the calculated position and to exclude a specific object from the field of view of the image collection unit if the image processing unit recognizes that the user is deliberately occluding the specific object.

32. The method of claim 31, wherein the first image is processed so as to determine a desired field of view of the camera image collection unit based upon the positioning of the at least one body part.

33. The method of claim 32, further comprising generating a signal suitable for the control of the field of view of the camera image collection unit.

34. The method according to claim 32, wherein the collected first image is an image including a plurality of user body parts and the image is processed to calculate the positions of the body parts and to further control the field of view Of the camera image collection unit based on the calculated body part positions.

35. The method as claimed in claim 34, wherein the positions act to define edges of an area.

36. The method as claimed in claim 34, wherein the positions act to define corners of an area.

37. The method as claimed in claim 32, wherein a single collected image is processed so as to calculate a respective position of each of two body parts of the user.

38. The method as claimed in claim 32, wherein two collected images are processed so as to calculate from each image a respective position of a single body part of the user.

39. The method as claimed in claim 32, wherein the body part comprises at least one selected from a group consisting of a finger; a thumb; a hand; a wrist; an arm; at least two fingers; and a finger and a thumb.

* * * * *